(12) United States Patent
Lys et al.

(10) Patent No.: US 8,816,593 B2
(45) Date of Patent: Aug. 26, 2014

(54) METHOD AND APPARATUS SELECTIVELY DETERMINING UNIVERSAL VOLTAGE INPUT FOR SOLID STATE LIGHT FIXTURES

(75) Inventors: Ihor Lys, Milton, MA (US); Michael Datta, Brookline, MA (US); Gregory Campbell, Quincy, MA (US)

(73) Assignee: Koninklijke Philips N.V., Eindhoven (NL)

( * ) Notice: Subject to any disclaimer, the term of this patent is extended or adjusted under 35 U.S.C. 154(b) by 134 days.

(21) Appl. No.: 13/509,863

(22) PCT Filed: Apr. 13, 2010

(86) PCT No.: PCT/IB2010/051594
§ 371 (c)(1),
(2), (4) Date: May 15, 2012

(87) PCT Pub. No.: WO2011/061633
PCT Pub. Date: May 26, 2011

(65) Prior Publication Data
US 2012/0235585 A1    Sep. 20, 2012

Related U.S. Application Data

(60) Provisional application No. 61/285,580, filed on Dec. 11, 2009, provisional application No. 61/262,770, filed on Nov. 19, 2009.

(51) Int. Cl.
*H05B 41/36* (2006.01)
*H05B 37/02* (2006.01)
*H05B 39/00* (2006.01)

(52) U.S. Cl.
USPC ............ 315/200 R; 315/291; 315/224

(58) Field of Classification Search
USPC ............ 323/300; 315/194, 200 R; 702/66
See application file for complete search history.

(56) References Cited

U.S. PATENT DOCUMENTS

| | | | |
|---|---|---|---|
| 5,872,429 | A | 2/1999 | Xia et al. |
| 6,016,038 | A | 1/2000 | Mueller et al. |
| 6,211,626 | B1 | 4/2001 | Lys et al. |
| 7,256,554 | B2 | 8/2007 | Lys |

(Continued)

FOREIGN PATENT DOCUMENTS

WO    2008023341 A3    2/2008

OTHER PUBLICATIONS

Microchip Technology Inc 2007—PIC12F683, 8 Pin Flash Based, 8-Bit CMOS Microcontrollers with nano Watt Technology.*

*Primary Examiner* — Douglas W Owens
*Assistant Examiner* — Wei Chan
(74) *Attorney, Agent, or Firm* — Yuliya Mathis

(57) ABSTRACT

A device for detecting a dimmer phase angle set by operation of a dimmer for a solid state lighting load includes a processor having a digital input, a first diode connected between the digital input and a voltage source and a second diode connected between the digital input and ground. The device further includes a first capacitor connected between the digital input and a detection node, a second capacitor connected between the detection node and ground, and a resistance connected between the detection node and a rectified voltage node, which receives a rectified voltage from the dimmer. The processor is configured to sample digital pulses at the digital input based on the rectified voltage and to identify the dimmer phase angle based on lengths of the sampled digital pulses.

18 Claims, 16 Drawing Sheets

(56) References Cited

U.S. PATENT DOCUMENTS

| | | | |
|---|---|---|---|
| 7,291,988 B2 * | 11/2007 | Hung ............................ | 315/291 |
| 8,102,167 B2 * | 1/2012 | Irissou et al. ................. | 323/300 |
| 2007/0182347 A1 | 8/2007 | Shteynberg et al. | |
| 2008/0252233 A1 * | 10/2008 | Wu .............................. | 315/291 |
| 2011/0037399 A1 * | 2/2011 | Hung et al. ................... | 315/219 |

* cited by examiner

METHOD AND APPARATUS SELECTIVELY DETERMINING UNIVERSAL VOLTAGE INPUT FOR SOLID STATE LIGHT FIXTURES

CROSS-REFERENCE TO RELATED APPLICATIONS

This application claims priority to U.S. provisional patent application No. 61/262,770, filed Nov. 19, 2009, and U.S. provisional patent application No. 61/285,580, filed Dec. 11, 2009, the disclosures of which are hereby incorporated by reference in their entireties.

TECHNICAL FIELD

The present invention is directed generally to control of solid state lighting fixtures. More particularly, various inventive methods and apparatuses disclosed herein relate to digital detection of dimmer phase angles and/or the presence of dimmers for solid state lighting systems. Also, various inventive methods and apparatuses disclosed herein relate to selectively determining input voltage to solid state lighting fixtures based on the detected dimmer phase angles.

BACKGROUND

Digital or solid state lighting technologies, i.e., illumination based on semiconductor light sources, such as light-emitting diodes (LEDs), offer a viable alternative to traditional fluorescent, high-intensity discharge (HID), and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

Some of the fixtures embodying these sources feature a lighting module, including one or more LEDs capable of producing white light and/or different colors of light, e.g., red, green and blue, as well as a controller or processor for independently controlling the output of the LEDs in order to generate a variety of colors and color-changing lighting effects, for example, as discussed in detail in U.S. Pat. Nos. 6,016,038 and 6,211,626. LED technology includes line voltage powered luminaires, such as the ESSENTIALWHITE series, available from Philips Color Kinetics. Such luminaires may be dimmable using trailing edge dimmer technology, such as electric low voltage (ELV) type dimmers for 120 VAC line voltages (or input mains voltages).

Many lighting applications make use of dimmers. Conventional dimmers work well with incandescent (bulb and halogen) lamps. However, problems occur with other types of electronic lamps, including compact fluorescent lamp (CR), low voltage halogen lamps using electronic transformers and solid state lighting (SSL) lamps, such as LEDs and OLEDs. Low voltage halogen lamps using electronic transformers, in particular, may be dimmed using special dimmers, such as electric low voltage (ELV) type dimmers or resistive-capacitive (RC) dimmers, which work adequately with loads that have a power factor correction (PFC) circuit at the input.

However, conventional solid state luminaires, including LED white lighting fixtures, are input voltage dependent. Thus, the various types of solid state white lighting fixtures operate only at specific line voltages for which they are respectively designed. The value and frequency of the line voltages may differ, depending on various factors, such as geographic location of the user (e.g., U.S. markets typically require a 120 VAC, 60 Hz line voltage while European markets typically require a 230 VAC, 50 Hz line voltage) and physical location of the installed solid state white lighting fixture (e.g., fixtures installed in high alcoves typically require 277 VAC line voltage while fixtures installed in under-cabinet environments typically require 120 VAC line voltage).

Such operational differences among the various types of solid state white lighting fixtures cause confusion and practical inefficiencies for manufacturers and users. For example, electrical contractors typically must have multiple sets of inventory on hand corresponding to the number of different line voltages available in a particular construction project. The sets of inventory must be carefully managed through installation, or new LED white lighting fixtures may be ruined by application of an incorrect input line voltage. In addition, while LED white lighting fixtures designed to run at different input line voltages may have the same printed circuit boards, other components differ based on design differences needed to accommodate operation at 100 VAC, 120 VAC, 230 VAC or 277 VAC input line voltages, for example. This is inefficient from a supply chain and manufacturing perspective, since each input line voltage requires its own custom bill of materials, stock keeping units, and the like. Managing this has proved troublesome, as it is difficult to forecast demand. Therefore, marketing, supply chain and manufacturing would benefit from an LED white light or other solid state lighting fixture having a universal voltage input.

Also, conventional dimmers typically chop a portion of each waveform of the input mains voltage signal and pass the remainder of the waveform to the lighting fixture. A leading edge or forward-phase dimmer chops the leading edge of the voltage signal waveform. A trailing edge or reverse-phase dimmer chops the trailing edges of the voltage signal waveforms. Electronic loads, such as LED drivers, typically operate better with trailing edge dimmers.

Incandescent and other conventional resistive lighting devices respond naturally without error to a chopped sine wave produced by a phase chopping dimmer. In contrast, LED and other solid state lighting loads may incur a number of problems when placed on such phase chopping dimmers, such as low end drop out, triac misfiring, minimum load issues, high end flicker, and large steps in light output. Some of these problems are dependent on the dimmer setting. Therefore, to address these problems, it may be necessary to electrically determine the setting or phase angle to which the dimmer is set.

SUMMARY

The present disclosure is directed to inventive methods and devices for detecting a phase angle of a dimmer for a solid state lighting fixture or luminaire, and determining voltage input to the dimmer when the detected phase angle is above a determination threshold setting and retrieving a previously determined voltage input when the phase angel is below the threshold setting.

Generally, in one aspect, a device for detecting a dimmer phase angle set by operation of a dimmer for a solid state lighting load includes a processor having a digital input, a first diode connected between the digital input and a voltage source and a second diode connected between the digital input and ground. The device further includes a first capacitor connected between the digital input and a detection node, a second capacitor connected between the detection node and ground, and a resistance connected between the detection node and a rectified voltage node, which receives a rectified voltage from the dimmer. The processor is configured to sample digital pulses at the digital input based on the rectified voltage and to identify the dimmer phase angle based on lengths of the sampled digital pulses.

In another aspect, a method is provided for selectively providing universal voltage input to a lighting fixture, including a dimmer, a power converter and a solid state lighting load. The method includes detecting a phase angle of the dimmer and determining whether the detected phase angle is below a determination threshold. When the detected phase angle is below the determination threshold, a power setting of the power converter is determined based on a previously determined input mains voltage value. When the detected phase angle is not below the determination threshold, the input mains voltage value is calculated and the power setting of the power converter is determined based on the calculated input mains voltage value.

In yet another aspect, a method is provided for detecting a dimmer phase angle set by operation of a dimmer for an LED. The method includes receiving a digital input signal corresponding to a dimmed rectified voltage from the dimmer, the dimmed rectified voltage having a signal waveform; detecting a rising edge of a pulse of the digital input signal corresponding to a rising edge of the signal waveform; sampling the pulse periodically to determine a length of the pulse; and determining the dimmer phase angle based on the length of the pulse.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., LED white lighting fixture) may include a number of dies which respectively emit different spectra of electroluminescence that, in combination, mix to form essentially white light. In another implementation, an LED white lighting fixture may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white light LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, microcontrollers, application specific integrated circuits (ASICs), and field-programmable gate arrays (FPGAs).

In various implementations, a processor and/or controller may be associated with one or more storage media (generically referred to herein as "memory," e.g., volatile and non-volatile computer memory such as random-access memory (RAM), read-only memory (ROM), programmable read-only memory (PROM), electrically programmable read-only memory (EPROM), electrically erasable and programmable read only memory (EEPROM), universal serial bus (USB) drive, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Applicants have recognized and appreciated that it would be beneficial to provide a circuit capable of detecting the level of dimming (dimmer phase angle) at which a dimmer is set for a solid state lighting fixture. Applicants have also recognized and appreciated that it would be beneficial to provide a circuit capable of detecting the presence (or absence) of a dimmer for a solid state lighting fixture.

In addition, Applicants have recognized and appreciated that it would be beneficial to provide power universally for solid state lighting fixtures using various different input mains voltages, such as 100 VAC, 120 VAC, 208 VAC, 230 VAC and 277 VAC, and that it would be beneficial to precisely determine the value of the input mains voltage when a dimmer setting is above a determination threshold or phase angle.

Figure 1:
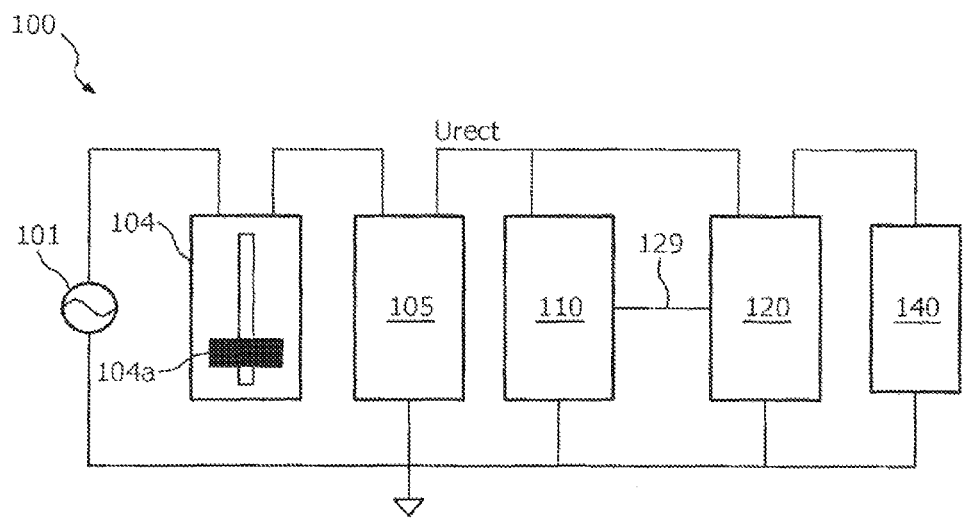
FIG. 1 is a block diagram showing a dimmable lighting system, including a solid state lighting fixture and a phase detector, according to a representative embodiment.

FIG. 1 is a block diagram showing a dimmable lighting system, including a solid state lighting fixture and a phase angle detector, according to a representative embodiment.

Referring to FIG. 1, dimmable lighting system 100 includes dimmer 104 and rectification circuit 105, which provide a (dimmed) rectified voltage Urect from voltage mains 101. The voltage mains 101 may provide different unrectified input mains voltages, such as 100 VAC, 120 VAC, 230 VAC and 277 VAC, according to various implementations. The dimmer 104 is a phase chopping dimmer, for example, which provides dimming capability by chopping leading edges (leading edge dimmer) or trailing edges (trailing edge dimmer) of voltage signal waveforms from the voltage mains 101 in response to vertical operation of its slider 104a. Generally, the magnitude of the rectified voltage Urect is proportional to a phase angle set by the dimmer 104, such that a lower phase angle results in a lower rectified voltage Urect. In the depicted example, it may be assumed that the slider is moved downward to lower the phase angle, reducing the amount of light output by solid state lighting load 140, and is moved upward to increase the phase angle, increasing the amount of light output by the solid state lighting load 140.

The dimmable lighting system 100 further includes phase angle detector 110 and power converter 120. Generally, the phase angle detector 110 detects the phase angle of the dimmer 104 based on the rectified voltage Urect. In various embodiments, the phase angle detector 110 may output a power control signal, e.g., via a control line 129, to the power converter 120, to the extent the phase angle detector 110 is configured to control operation of the power converter 120. The power control signal may be a pulse code modulation (PCM) signal or other digital signal, for example, and may alternate between high and low levels in accordance with a duty cycle determined by the phase angle detector 110 based on the detected phase angle. The duty cycle may range from about 100 percent (e.g., continually at the high level) to about zero percent (e.g., continually at the low level), and includes any percentage in between, for example, in order to adjust appropriately the power setting of the power converter 120 to control the level of light emitted by the solid state lighting load 140.

In various embodiments, the power converter 120 receives the rectified voltage Urect from the rectification circuit 105, and outputs a corresponding DC voltage for powering the solid state lighting load 140. The power converter 120 converts between the rectified voltage Urect and the DC voltage based on at least the magnitude of the voltage output from the dimmer 104 via the rectification circuit 105, e.g., set by operation of the slider 104a. The DC voltage output by the power converter 120 thus reflects the dimmer phase angle (i.e., the level of dimming) applied by the dimmer 104.

Figure 2:
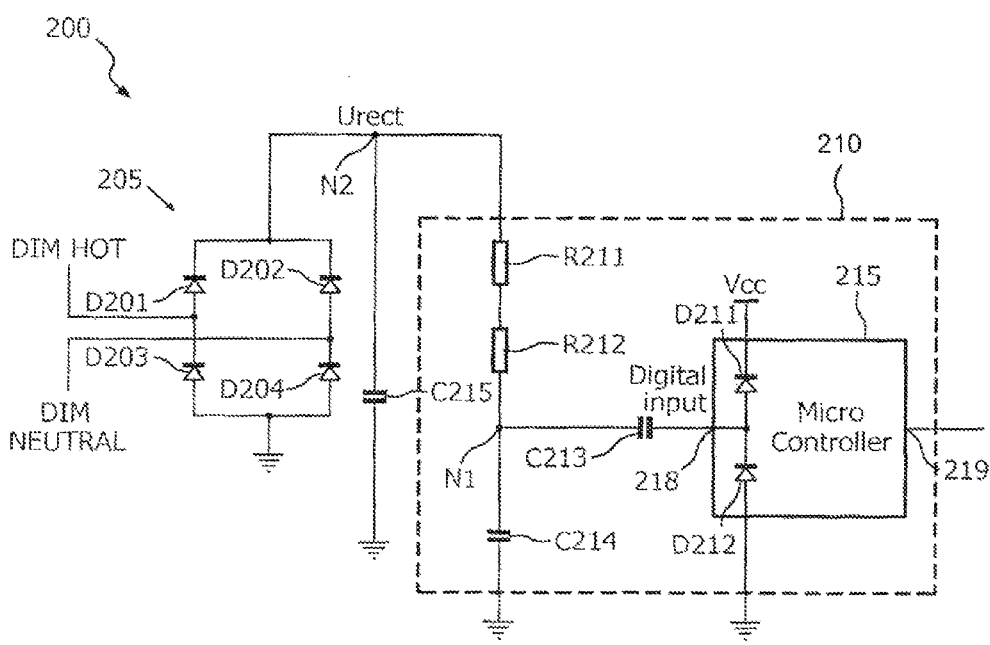
FIG. 2 is a circuit diagram showing a dimming control system, including a phase detection circuit, according to a representative embodiment.

FIG. 2 is a circuit diagram showing a dimming control system, including a dimmer phase angle detection circuit, according to a representative embodiment. The general components of FIG. 2 are similar to those of FIG. 1, although more detail is provided with respect to various representative components, in accordance with an illustrative configuration. Of course, other configurations may be implemented without departing from the scope of the present teachings.

Referring to FIG. 2, dimming control system 200 includes rectification circuit 205 and dimmer phase angle detection circuit 210 (dashed box). As discussed above with respect to the rectification circuit 105, the rectification circuit 205 is connected to a dimmer (not shown), indicated by the dim hot and dim neutral inputs to receive (dimmed) unrectified voltage from the voltage mains (not shown). In the depicted configuration, the rectification circuit 205 includes four diodes D201-D204 connected between rectified voltage node N2 and ground. The rectified voltage node N2 receives the (dimmed) rectified voltage Urect, and is connected to ground through input filtering capacitor C215 connected in parallel with the rectification circuit 205.

The phase angle detector 210 detects the dimmer phase angle (level of dimming) based on the rectified voltage Urect and, in various embodiments, may output a power control signal from PWM output 219, e.g., to a power converter to control operation of the LED load, discussed below with reference to FIG. 7. This allows the phase angle detector 210 to adjust selectively the amount of power delivered from the input mains to the LED load based on the detected phase angle.

In the depicted representative embodiment, the phase angle detection circuit 210 includes microcontroller 215, which uses waveforms of the rectified voltage Urect to determine the dimmer phase angle. The microcontroller 215 includes digital input 218 connected between a first diode D211 and a second diode D212. The first diode D211 has an anode connected to the digital input 218 and a cathode connected to voltage source Vcc, and the second diode 112 has an anode connected to ground and a cathode connected to the digital input 218. The microcontroller 215 also includes a digital output, such as PWM output 219.

In various embodiments, the microcontroller 215 may be a PIC12F683 processor, available from Microchip Technology, Inc., for example, although other types of microcontrollers or other processors may be included without departing from the scope of the present teachings. For example, the functionality of the microcontroller 215 may be implemented by one or more processors and/or controllers, connected to receive digital input between first and second diodes D211 and D212 as discussed above, which may be programmed using software or firmware (e.g., stored in a memory) to perform the various functions, or may be implemented as a combination of dedicated hardware to perform some functions and a processor (e.g., one or more programmed microprocessors and associated circuitry) to perform other functions. Examples of controller components that may be employed in various embodiments include, but are not limited to, conventional microprocessors, microcontrollers, ASICs and FPGAs, as discussed above.

The phase angle detection circuit 210 further includes various passive electronic components, such as first and second capacitors C213 and C214, and a resistance indicated by representative first and second resistors R211 and R212. The first capacitor C213 is connected between the digital input 218 of the microcontroller 215 and a detection node N1. The second capacitor C214 is connected between the detection node N1 and ground. The first and second resistors R211 and R212 are connected in series between the rectified voltage node N2 and the detection node N1. In the depicted embodiment, the first capacitor C213 may have a value of about 560 pF and the second capacitor C214 may have a value of about 10 pF, for example. Also, the first resistor R211 may have a value of about 1 megohm and the second resistor R212 may have a value of about 1 megohm, for example. However, the respective values of the first and second capacitors C213 and C214, and the first and second resistors R211 and R212 may vary to provide unique benefits for any particular situation or to meet application specific design requirements of various implementations, as would be apparent to one of ordinary skill in the art.

The (dimmed) rectified voltage Urect is AC coupled to the digital input 218 of the microcontroller 215. The first resistor R211 and the second resistor R212 limit the current into the digital input 218. When a signal waveform of the rectified voltage Urect goes high, the first capacitor C213 is charged on the rising edge through the first and second resistors R211 and R212. The first diode D211 clamps the digital input 218 one diode drop above the voltage source Vcc, for example, while the first capacitor C213 is charged. The first capacitor C213 remains charged as long as the signal waveform is not zero. On the falling edge of the signal waveform of the rectified voltage Urect, the first capacitor C213 discharges through the second capacitor C214, and the digital input 218 is clamped to one diode drop below ground by the second diode D212. When a trailing edge dimmer is used, the falling edge of the signal waveform corresponds to the beginning of the chopped portion of the waveform. The first capacitor C213 remains discharged as long as the signal waveform is zero. Accordingly, the resulting logic level digital pulse at the digital input 218 closely follows the movement of the chopped rectified voltage Urect, examples of which are shown in FIGS. 3A-3C.

Figure 3A:
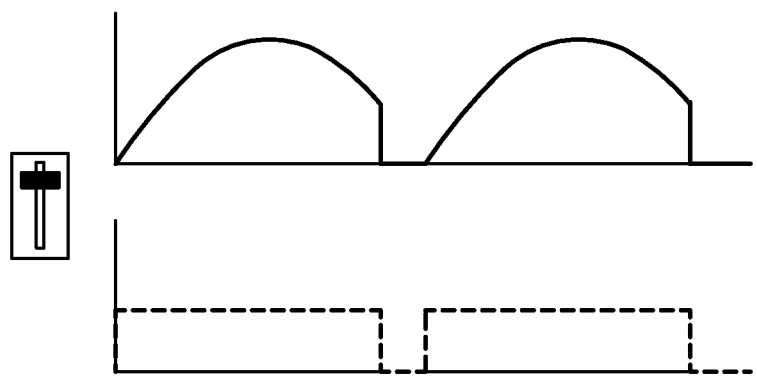
FIGS. 3A-3C show sample waveforms and corresponding digital pulses of a dimmer, according to a representative embodiment.
Figure 3B:
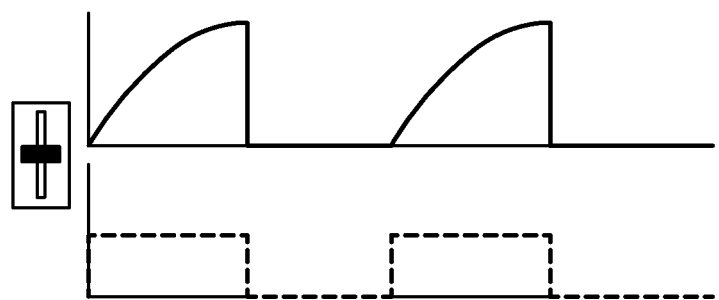
Figure 3C:
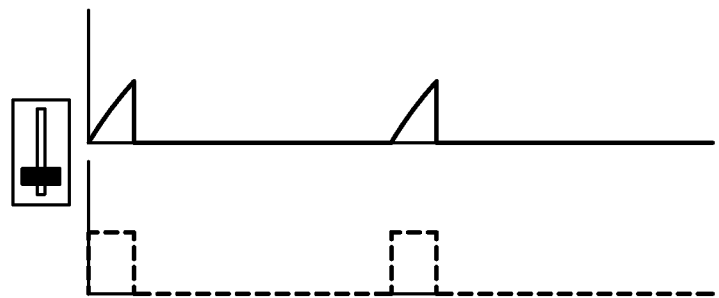

More particularly, FIGS. 3A-3C show sample waveforms and corresponding digital pulses at the digital input 218, according to representative embodiments. The top waveforms in each figure depict the chopped rectified voltage Urect, where the amount of chopping reflects the level of dimming. For example, the waveforms may depict a portion of a full 170V (or 340V for E.U.) peak, rectified sine wave that appears at the output of the dimmer. The bottom square waveforms depict the corresponding digital pulses seen at the digital input 218 of the microcontroller 215. Notably, the length of each digital pulse corresponds to a chopped waveform, and thus is equal to the amount of time the dimmer's internal switch is "on." By receiving the digital pulses via the digital input 218, the microcontroller 215 is able to determine the level to which the dimmer has been set.

FIG. 3A shows sample waveforms of rectified voltage Urect and corresponding digital pulses when the dimmer is at its highest setting, indicated by the top position of the dimmer slider shown next to the waveforms. FIG. 3B shows sample waveforms of rectified voltage Urect and corresponding digital pulses when the dimmer is at a medium setting, indicated by the middle position of the dimmer slider shown next to the waveforms. FIG. 3C shows sample waveforms of rectified voltage Urect and corresponding digital pulses when the dimmer is at its lowest setting, indicated by the bottom position of the dimmer slider shown next to the waveforms.

Figure 4:
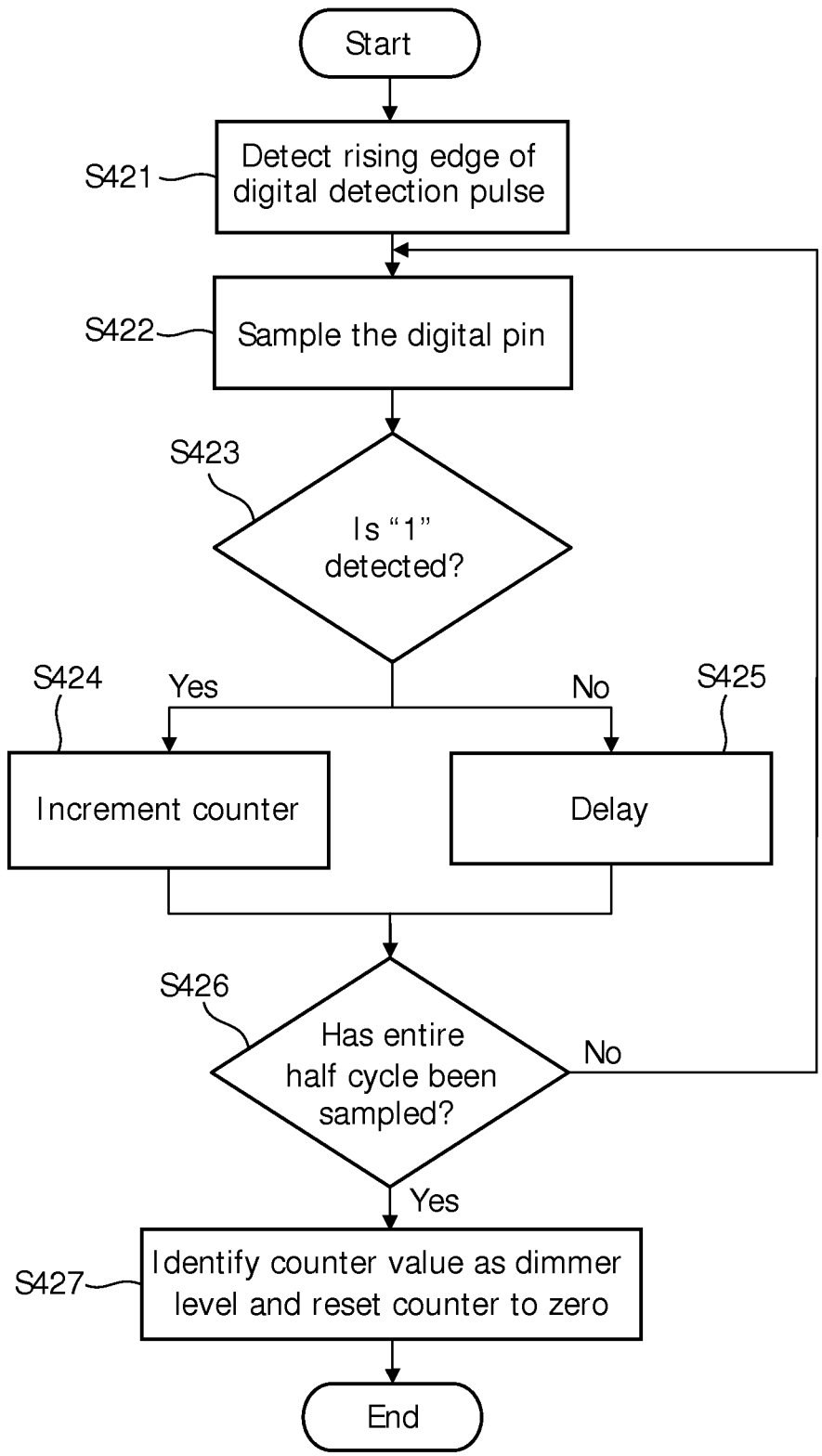
FIG. 4 is a flow diagram showing a process of detecting phase angle of a dimmer, according to a representative embodiment.

FIG. 4 is a flow diagram showing a process of detecting the dimmer phase angle of a dimmer, according to a representative embodiment. The process may be implemented by firmware and/or software executed by the microcontroller 215 shown in FIG. 2, or more generally by a processor or controller, e.g., the phase angle detector 110 shown in FIG. 1, for example.

In block S421 of FIG. 4, a rising edge of a digital pulse of an input signal (e.g., indicated by rising edges of the bottom waveforms in FIGS. 3A-3C) is detected, for example, by initial charging of the first capacitor C213. Sampling at the digital input 218 of the microcontroller 215, for example, begins in block S422. In the depicted embodiment, the signal is sampled digitally for a predetermined time equal to just under a mains half cycle. Each time the signal is sampled, it is determined in block S423 whether the sample has a high level (e.g., digital "1") or a low level (e.g., digital "0"). In the depicted embodiment, a comparison is made in block S423 to determine whether the sample is digital "1." When the sample is digital "1" (block S423: Yes), a counter is incremented in block S424, and when the sample is not digital "1" (block S423: No), a small delay is inserted in block S425. The delay is inserted so that the number of clock cycles (e.g., of the microcontroller 215) is equal regardless of whether the sample is determined to be digital "1" or digital "0."

In block S426, it is determined whether the entire mains half cycle has been sampled. When the mains half cycle is not complete (block S426: No), the process returns to block S422 to again sample the signal at the digital input 218. When the mains half cycle is complete (block S426: Yes), the sampling stops and the counter value accumulated in block S424 is identified as the current dimmer phase angle in block S427, and the counter is reset to zero. The counter value may be stored in a memory, examples of which are discussed above. The microcontroller 215 may then wait for the next rising edge to begin sampling again.

For example, it may be assumed that the microcontroller 215 takes 255 samples during a mains half cycle. When the dimming level or phase angle is set by the slider near the top of its range (e.g., as shown in FIG. 3A), the counter will increment to about 255 in block S424 of FIG. 4. When the dimming level is set by the slider near the bottom of its range (e.g., as shown in FIG. 3C), the counter will increment to only about 10 or 20 in block S424. When the dimming level is set somewhere in the middle of its range (e.g., as shown in FIG.

3B), the counter will increment to about 128 in block S424. The value of the counter thus gives the microcontroller 215 an accurate indication of the level to which the dimmer has been set or the phase angle of the dimmer. In various embodiments, the dimmer phase angle may be calculated, e.g., by the microcontroller 215, using a predetermined function of the counter value, where the function may vary in order to provide unique benefits for any particular situation or to meet application specific design requirements of various implementations, as would be apparent to one of ordinary skill in the art.

Accordingly, the phase angle of the dimmer may be electronically detected, using minimal passive components and a digital input structure of a microcontroller (or other processor or controller circuit). In an embodiment, the phase angle detection is accomplished using an AC coupling circuit, a microcontroller diode clamped digital input structure and an algorithm (e.g., implemented by firmware, software and/or hardware) executed to determine the dimmer setting level. Additionally, the condition of the dimmer may be measured with minimal component count and taking advantage of the digital input structure of a microcontroller.

The phase angle digital detection circuit and associated algorithm may be used in various situations where it is desired to know the phase angle of a phase chopping dimmer. For example, electronic transformers which run as a load to a phase chopping dimmer can use this circuit and method to determine the dimmer phase angle. Once the dimmer phase angle is known, the range of dimming and compatibility with dimmers with respect to solid state lighting fixtures (e.g. LEDs) may be improved. Examples of such improvements include controlling the color temperature of a lamp with dimmer setting, determining the minimum load a dimmer can handle in situ, determining when a dimmer behaves erratically in situ, increasing maximum and minimum ranges of light output, and creating custom dimming light to slider position curves.

The dimmer phase angle detection circuit, according to various embodiments, may be implemented in various EssentialWhite™ and/or eW products available from Philips Color Kinetics, including eW Blast PowerCore, eW Burst PowerCore, eW Cove MX PowerCore, and eW PAR 38, and the like. Further, it may be used as a building block of "smart" improvements to various products to make them more dimmer friendly.

In various embodiments, a detection circuit, such as the representative detection circuit depicted in FIG. 2, likewise may be used to determine the presence or absence of a phase chopping dimmer. Dimmer problems that occur independently of the dimmer phase angle may be adequately addressed by first determining whether the power converter is connected as the load of a dimmer. In these cases, a simple binary determination as to whether a dimmer is present is sufficient, and additional information regarding the dimmer phase angle is not needed, thus avoiding the phase angle detection, described above, which is more computationally intensive than a simple binary detection of whether a dimmer is present. The determination of the presence of a dimmer may be sufficient to take some action to improve compatibility of phase cutting dimmers with LED drivers, for example. Further, a binary dimmer presence algorithm may be incorporated as a part of larger algorithms, such as determining the universal input mains voltage.

Figure 5:
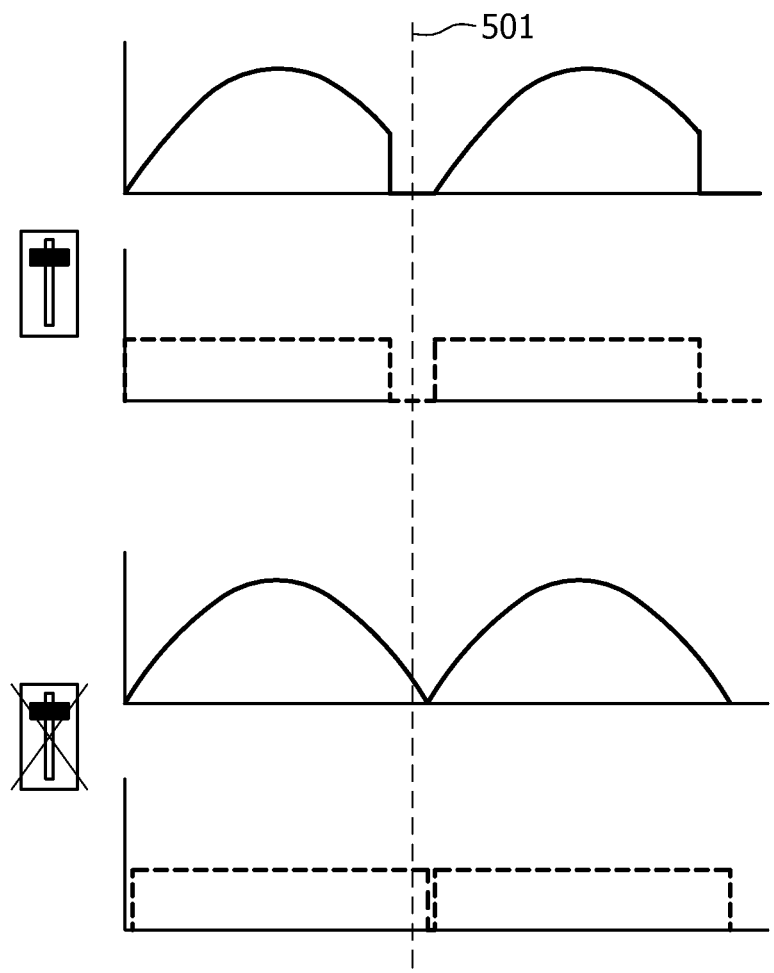
FIG. 5 shows sample waveforms and corresponding digital pulses of a solid state lighting fixture with and without a dimmer, according to a representative embodiment.

FIG. 5 shows sample waveforms and corresponding digital pulses of a lighting fixture with and without a dimmer, according to a representative embodiment.

Referring to FIG. 5, the top set of waveforms shows the rectified input mains voltage and the corresponding detected logic level digital pulses with a dimmer connected (indicated by the adjacent dimmer switch). The bottom set of waveforms shows the rectified input mains voltage and the corresponding logic level digital pulses without a dimmer connected (indicated by an "X" through the adjacent dimmer switch). The dashed line 501 indicates a representative upper level threshold corresponding to the dimmer. The upper level threshold may be determined by various means, including empirically measuring an "on" time of the dimmer at its highest setting, retrieving the "on" time from a manufacturer database, or the like.

A phase chopping dimmer does not allow the full rectified mains voltage sine wave through, but rather chops a section of each waveform, even at its highest setting, as shown in the top set of waveforms. In comparison, without a dimmer connected, the full rectified mains voltage sine wave is able to pass, as shown in the bottom set of waveforms. For example, if the digital pulse, as determined by the phase angle detector 210, does not extend beyond the upper level threshold (as shown in the top set of waveforms), it is determined that a dimmer is present. If the digital pulse extends beyond the upper level threshold (as shown in the bottom set of waveforms), it is determined that a dimmer is not present.

Figure 6:
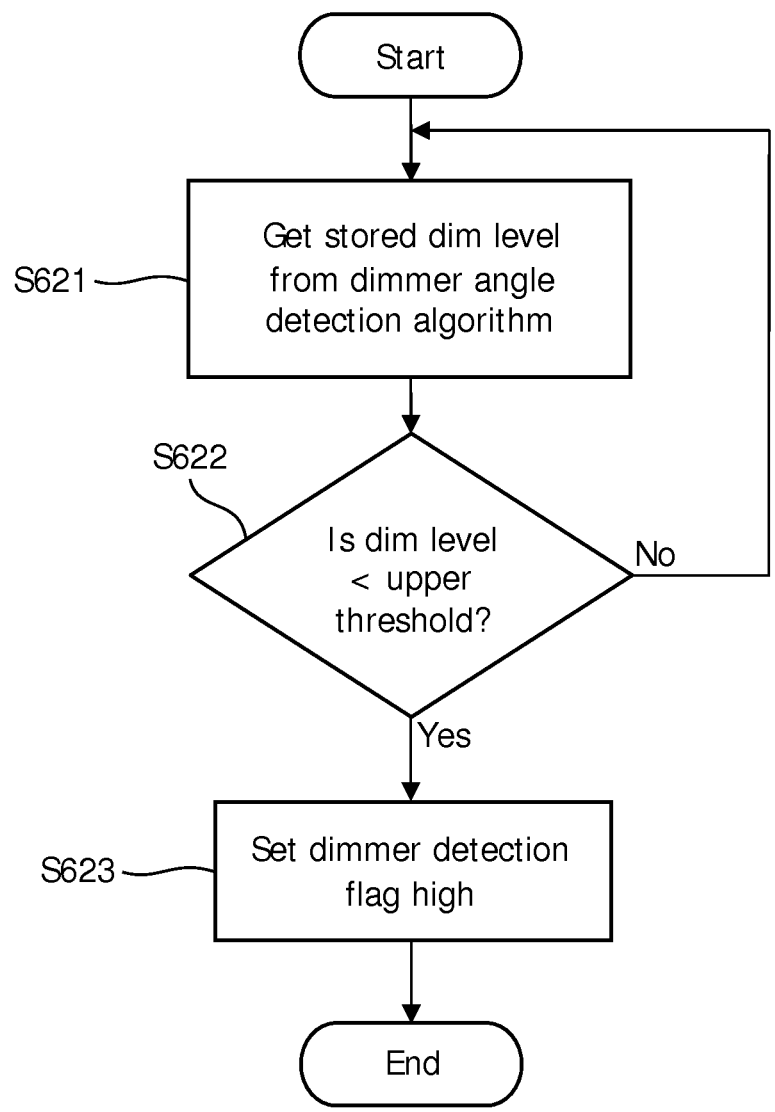
FIG. 6 is a flow diagram showing a process of detecting presence of a dimmer, according to a representative embodiment.

FIG. 6 is a flow diagram showing a process of determining whether a dimmer is present, according to a representative embodiment. The process may be implemented, for example, by firmware and/or software executed by the microcontroller 215 of FIG. 2.

In block S621, the determined dimmer phase angle is retrieved. For example, the dimmer phase angle as detected according to the algorithm depicted in FIG. 4 may be retrieved from memory (e.g., in which the dimmer phase angle information was stored in block S427). It is determined in block S622 whether the dimmer phase angle (e.g., length of the digital pulse) is less than the upper level threshold. When the dimmer phase angle is not less than the upper level threshold (block S622: No), the process returns to block S621 and the determined dimmer phase angle is again retrieved so that the dimmer phase angle continues to be monitored. Also, in various embodiments, a dimmer detection flag may be set "low," indicating that a dimmer is not present, and/or the process may end. When the dimmer phase angle is determined to be less than the upper level threshold (block S622: Yes), a dimmer detection flag is set "high" in block S623, for example, indicating the presence of a dimmer. Of course, in alternative embodiments, it may be determined whether the retrieved phase angle is greater than (as opposed to less than) the upper level threshold, without departing from the scope of the present teachings.

Accordingly, the presence or absence of a dimmer may be electronically detected, using minimal passive components and a digital input structure of a microcontroller (or other processor or processing circuit). In an embodiment, dimmer detection is accomplished using an AC coupling circuit, a microcontroller diode clamped digital input structure and an algorithm (e.g., implemented by firmware, software and/or hardware) executed for binary determination of dimmer presence. As stated above, electronically detecting whether or not a solid state lighting (e.g., LED) power converter is connected as a load to a phase cutting dimmer may be accomplished using the same components of the representative embodiment depicted in FIG. 2, for example, although a computationally less intensive and timing insensitive algorithm may be used.

The dimmer presence detection circuit and associated algorithm may be used in various situations where it is desired to know whether or not an electronic transformer is connected as the load of a phase chopping dimmer, for example. Once the presence or absence of a dimmer has been determined, compatibility with dimmers with respect to solid state lighting fixtures (e.g. LEDs) may be improved. Examples of such improvements include compensating for high end power loss due to a dimmer's full "on" phase chop, increasing efficiency by shutting off all unnecessary functions if a dimmer is not present, and switching in a bleeding load to help a dimmer's minimum load requirement if a dimmer is present.

The dimmer detection circuit, according to various embodiments, may be implemented in various Essential-White™ and/or eW products available from Philips Color Kinetics, including eW Blast PowerCore, eW Burst PowerCore, eW Cove MX PowerCore, and eW PAR 38, and the like. Further, it may be used as a building block of "smart" improvements to various products to make them more dimmer friendly.

In various embodiments, the functionality of the microcontroller 215 may be implemented by one or more processing circuits, constructed of any combination of hardware, firmware or software architectures, and may include its own memory (e.g., nonvolatile memory) for storing executable software/firmware executable code that allows it to perform the various functions. For example, the functionality may be implemented using ASICs, FPGAs, and the like.

Applicants have further recognized and appreciated that, in addition to a circuit capable of detecting the dimmer phase angle for a solid state lighting fixture, and/or whether a phase chopping dimmer is present, it would be beneficial to provide a circuit that determines the input mains voltage for providing universal voltage input to a solid state lighting fixture, when the dimmer level is set sufficiently high to make such a determination. Otherwise, a previously determined input mains voltage is retrieved, e.g., from memory.

Figure 7:
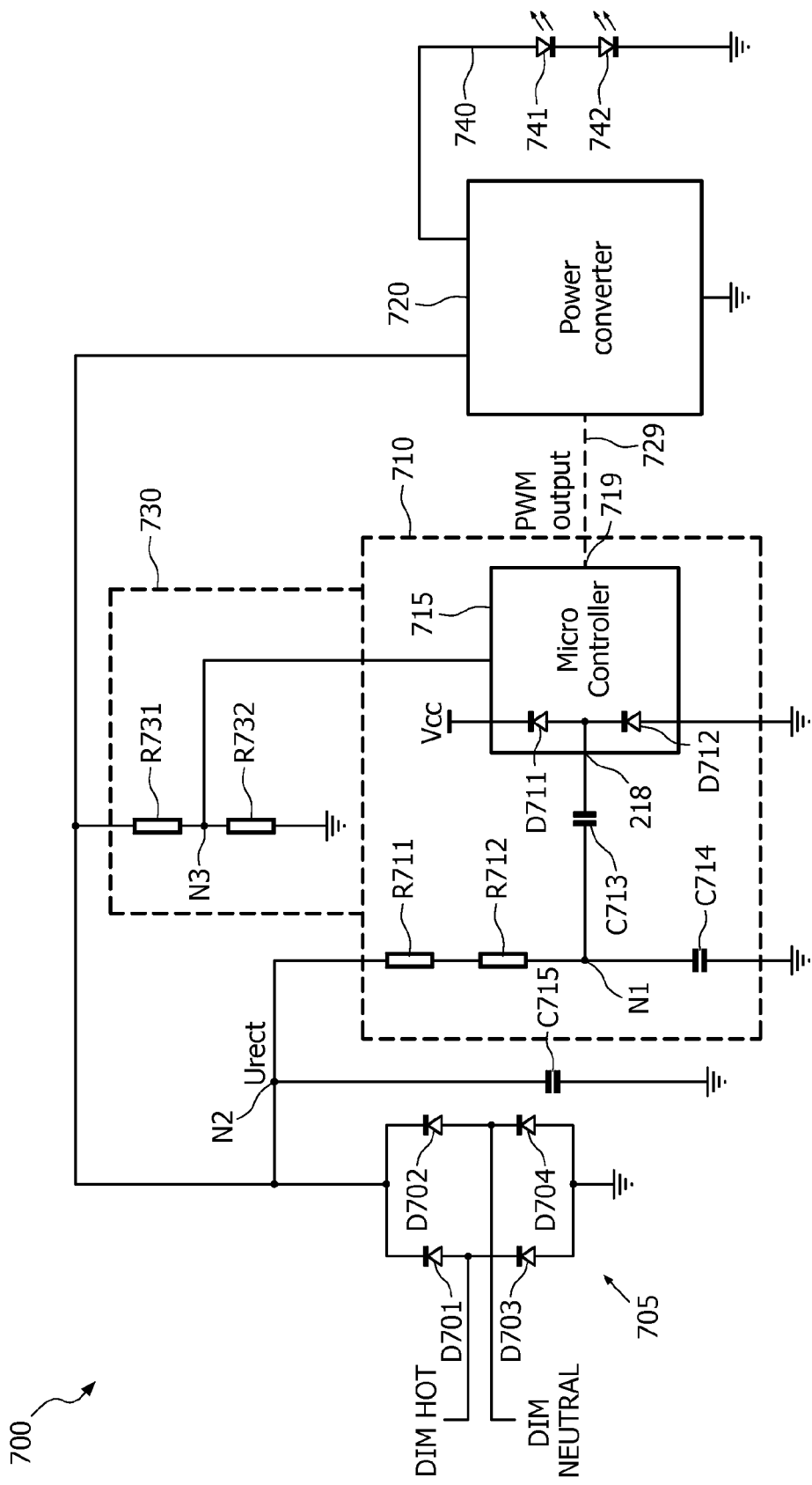
FIG. 7 is a circuit diagram showing a dimming control system, including a solid state lighting fixture and a phase detection circuit, according to a representative embodiment.

FIG. 7 is a circuit diagram showing a representative lighting system for a solid state lighting fixture, according to various embodiments. Similar to the dimming control system 200 of FIG. 2, the dimming control system 700 depicted in FIG. 7 includes rectification circuit 705 connected to a dimmer (not shown), dimmer phase angle detection circuit 710 (dashed box), power converter 720, input waveform sampling circuit 730 (dashed box) and LED load 740. The microcontroller 715 is included in both the dimmer phase angle detection circuit 710 and the input waveform sampling circuit 730.

In the depicted configuration, the rectification circuit 705 includes four diodes D701-D704 connected between rectified voltage node N2 and ground. The rectified voltage node N2 receives the (dimmed) rectified voltage Urect, and is connected to ground through input filtering capacitor C715 connected in parallel with the rectification circuit 705.

The dimmer phase angle detection circuit 710 includes microcontroller 715, which has a digital output, such as PWM output 719 connected to control line 729. In various embodiments, the microcontroller 715 may be a PIC12F683, available from Microchip Technology, Inc., for example, although other types of microcontrollers or other processors may be included without departing from the scope of the present teachings, as discussed above with respect to microcontroller 215 in FIG. 2. In the depicted embodiment, the phase angle detection circuit 710 further includes first and second capacitors C713 and C714 and first and second resistors R711 and R712, which are configured and operate substantially the same as first and second capacitors C213 and C214 and first and second resistors R211 and R212 of FIG. 2, and thus the corresponding descriptions will not be repeated. Accordingly, a logic level digital pulse at the digital input 718 of the microcontroller 715 closely follows the movement of the chopped rectified voltage Urect, AC coupled to the digital input 718 of the microcontroller 715.

In addition, the input waveform sampling circuit 730 also includes the microcontroller 715, as well as a voltage divider including third and fourth resistors R731 and R732, which provides a divided down version of the rectified voltage Urect. In the depicted embodiment, the third resistor R731 is connected between the rectified voltage node N2 and waveform sampling node N3, and the fourth resistor R732 is connected between the waveform sampling node N3 and ground. In an embodiment, the third resistor R731 may have a value of about 1.5 megohm and the fourth resistor R732 may have a value of about 15 kohm, for example. However, the respective values of the third and fourth resistors R731 and R732 may vary to provide unique benefits for any particular situation or to meet application specific design requirements of various implementations, as would be apparent to one of ordinary skill in the art.

The input waveform sampling circuit 730 essentially provides a divided down version of the input rectified voltage Urect from the rectification circuit 705, which enables the microcontroller 715 to determine an accurate representation of the input waveforms via an analog input 717. The microcontroller 715 may use the waveforms to determine the unchopped input mains voltage, i.e., the voltage at the input to the dimmer. As part of the dimmer phase angle detection circuit 710, discussed above, the microcontroller 715 also receives information regarding the phase angle (or level of dimming) of the dimmer.

As discussed above, the power converter 720 operates in an open loop or feed-forward fashion, as described in U.S. Pat. No. 7,256,554 to Lys, for example, which is hereby incorporated by reference. The microcontroller 715 is able to adjust the power setting of the power converter 720 using a power control signal output at the PWM output 719 via control line 729. In various embodiments, the power converter 720 may be an L6562, available from ST Microelectronics, for example, although other types of microcontrollers, power converters and other processors may be included without departing from the scope of the present teachings.

Figure 8A:
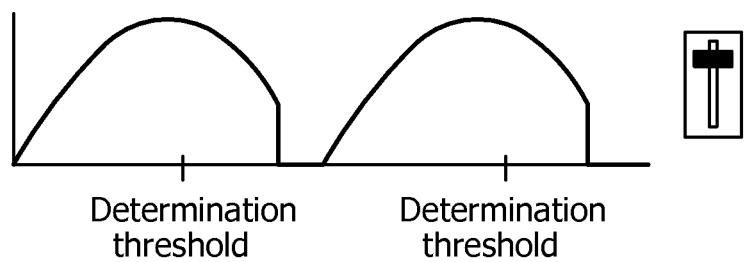
FIG. 8A shows sample waveforms of a dimmer having a setting level above a determination threshold, according to a representative embodiment.
Figure 8B:
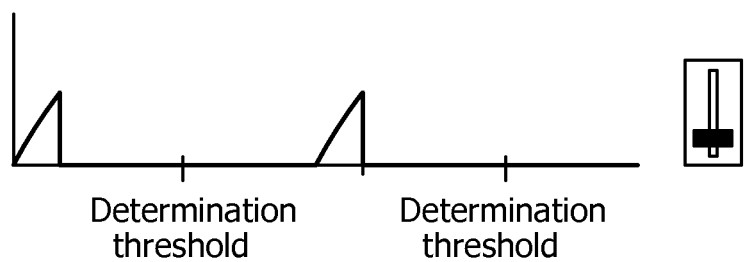
FIG. 8B shows sample waveforms of a dimmer having a setting level below a determination threshold, according to a representative embodiment.

Generally, a software and/or firmware algorithm executed by the microcontroller 715 takes advantage of the fact that at high dimmer phase angles (less chopped waveforms), as shown in FIG. 8A, the input mains voltage can be more accurately determined, which may then be used to more accurately set the power setting of the power converter 720. However, at lower dimmer phase angles (more heavily chopped waveforms), as shown in FIG. 8B, the determination of the input mains voltage becomes computationally intensive and requires a high end microcontroller, or other processor or controller, because so little of the waveforms are available for measurement. Therefore, according to various embodiments, an example of which is discussed below with reference to FIG. 9, instead of performing such intensive analysis at the lower dimmer phase angles, the power control signal is set based on a previously determined and stored value of the input mains voltage, e.g., calculated when the dimmer was at a high dimmer phase angle, or is calculated using a more flexible (but less precise) binning algorithm, an example of which is discussed below with reference to FIG. 13. This avoids having to incorporate a high end microcontroller and/or relatively long processing times.

The dimmer phase angle above which a more precise determination of the input waveforms and the input mains voltage may occur is referred to as a determination threshold. In various embodiments, the determination threshold is a predetermined phase angle of the dimmer at which the microcontroller 715 is able to gather sufficient samples to make an accurate determination of the input mains voltage. The determination threshold may therefore change depending on various factors, such as the speed of the microcontroller 715 and the effectiveness of the algorithm used to determine the input mains voltage from the chopped waveform, for example. The cost of the microcontroller 715 and the accuracy of the power signal provided by the microcontroller 715 to the power converter 720 via the control line 729 can therefore be traded off.

FIG. 8A shows sample waveforms of a dimmer having a phase angle above the determination threshold, according to a representative embodiment, such that a precise input voltage measurement can be made by the microcontroller 715, e.g., via the input waveform sampling circuit 730 and the analog input 717 shown in FIG. 7, using peak and slope detection algorithms discussed below, e.g., with reference to FIGS. 14 and 15, respectively. FIG. 8B shows sample waveforms of a dimmer having a phase angle below the determination threshold, according to a representative embodiment, such that a previously determined input voltage, e.g., calculated when the dimmer phase angle was above the determination threshold, and corresponding last best power setting are used to set the power of the power converter. Alternatively, when a previously determined input voltage is not available, the input voltage and corresponding power setting may be determined using an alternative, somewhat less precise method of calculation, such as binning, an example of which is discussed below with reference to FIG. 13.

Figure 9:
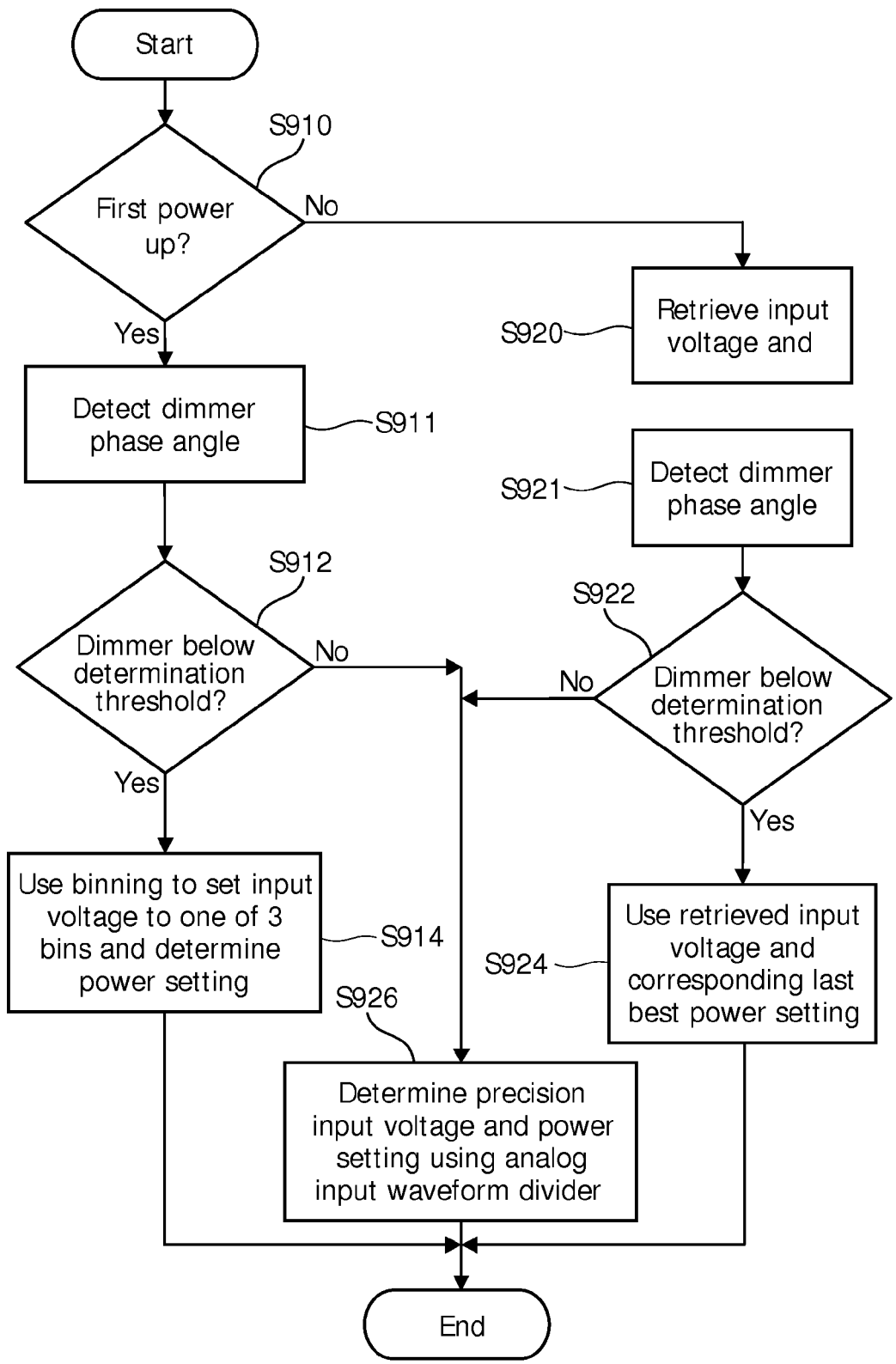
FIG. 9 is a flow diagram showing a process of determining input mains voltage using detected phase angle of a dimmer, according to a representative embodiment.

FIG. 9 is a flow diagram showing a process of determining input mains voltage and corresponding power setting based on the detected dimmer phase angle, according to a representative embodiment.

Referring to FIG. 9, in the depicted embodiment, it is initially determined in block S910 whether the process is being performed pursuant to a first power-up of the solid state lighting fixture, which occurs the first time power is applied to the solid state lighting fixture. When it is not the first power up (block S910: No), a previously determined input mains voltage value is retrieved from memory, such as an EEPROM, in block S920. Alternatively, the memory may include any type of volatile or non-volatile computer memory, such as RAM, ROM, PROM, EPROM, USB drive, floppy disks, compact disks, optical disks, magnetic tape, or the like. The previously determined input mains voltage value is correlated with an associated power setting of the power converter 720 using a previously populated look-up table, for example, or other means of association. The associated power setting is applied to the power converter 720 via the power control signal output from the microcontroller 715, so that the solid state lighting fixture operates normally while the current input mains voltage is being determined.

The dimmer phase angle is detected in block S921. The dimmer phase angle may be obtained, for example, in accordance with the dimmer phase angle detection process shown in FIG. 4, discussed above. In block S922, it is determined whether the dimmer phase angle is below the determination threshold. When the dimmer phase angle is below the determination threshold (block S922: Yes), the previously determined input mains voltage and associated power setting, referred to as the last best power setting, are used as the current power setting in block S924. In an embodiment, the last best power setting is the power setting determined based on the input mains voltage retrieved in block S920, which is simply not changed in block S924 when the dimmer phase angle is below the determination threshold.

When the dimmer phase angle is not below the determination threshold (block S922: No), a new input mains voltage and corresponding power setting are determined in block S926. In an embodiment, the input waveform sampling circuit 730 and the analog input waveform divider of microcontroller 715 are used with the peak and slope detection algorithms, e.g., discussed below with reference to FIGS. 14 and 15, to determine the precision input mains voltage and power setting. For example, the microcontroller 715 may be implemented substantially the same as controller 1020 in FIG. 10, discussed below, and thus receive digital values of DC voltage signals from an analog-to-digital converter (such as A/D 1022 in FIG. 10), corresponding to the divided down version of the rectified voltage Urect from the voltage divider that includes third and fourth resistors R731 and R732.

Because the dimmer phase angle is known to be above the determination threshold, the exact input mains voltage may be determined on a continuum, as opposed to limiting the determination to one of multiple predetermined input voltage and power settings (i.e., binning), as discussed below with reference to FIG. 13. In other words the peak and slope detection methods of FIGS. 14 and 15 can be used to specifically determine the value of the input mains voltage and thus to determine a precise power setting. As previously discussed, the determined value of the input mains voltage may be correlated with a power setting using a previously populated look-up table, for example, or other means of association.

Referring again to block S910, when it is determined that it is the first power up (block S910: Yes), there is no previously determined input mains voltage power setting to load from memory. Thus, the process proceeds to block S911, where the dimmer phase angle is detected, as discussed above with respect to block S921. In block S912, it is determined whether the dimmer phase angle is below the determination threshold. When the dimmer phase angle is not below the determination threshold (block S912: No), a new input mains voltage and corresponding power setting are determined in block S926, as discussed above.

However, when the dimmer setting is below the determination threshold (block S912: Yes), because there is no previously determined input mains voltage to be retrieved, the binning detection algorithm is implemented in block S914 in order to place the input mains voltage in one of multiple bins, for example, 120V, 230V or 277V. An example of the binning detection algorithm discussed below with reference to FIG. 13. The power setting corresponding to the binned voltage is then used by the power converter 720 until it is determined that the dimmer phase angle has moved above the determination threshold, e.g., pursuant to subsequent performances of the method in FIG. 9, in which case a more accurate determination of the waveform, and thus the input mains voltage and power setting, may be made without binning. In various embodiments, block S914 may include an algorithm, other than binning, that requires less of the chopped waveforms than the input voltage determination algorithm of block S926 to estimate the input voltage (thus functioning at lower dimmer phase angles), without departing from the scope of the present teachings.

The phase angle and determination threshold detection circuit and associated algorithm may be used in various situations where it is desired to set the power setting of a power converter. According to various embodiments, the load LED power, for example, may be adjusted over a continuum range of input mains voltages using a relatively low power/low cost processor, when the dimmer phase angle is above the determination threshold. For example, the actual power to the LED load may be determined by the RMS input voltage and the signal the microcontroller sends to the power converter.

A binning process sets the power control signal sent to the power converter, e.g., from a microcontroller, to a limited number of possible values (e.g., three values in response to input mains voltages 120V, 230V or 277V). Because the actual power to the LEDs is determined by both the RMS input voltage and the microcontroller signal, when the RMS input voltage is for example at 179V or 208V, the precise power may not be delivered to the LEDs. For example, a binning implementation may not determine the difference between 100V (commonly used in Japan) and 120V (commonly in North America). As a result, when run at 100V, the binning implementation may set the power control signal from the microcontroller to a value appropriate for 120V, yet the RMS input voltage will be lower and thus the power delivered to the LEDs and the light output will be incorrect. Similarly, in the European Union, the input mains voltages are 220V or 240V, which may cause the same problem. Use of the digital phase angle detection circuit, e.g., of FIG. 2, enables the precise input mains voltage (and corresponding power setting) to be determined at least in those situations when the dimmer setting is high enough.

Also, as discussed above, it is difficult to determine the input mains voltage of a heavily chopped sine wave. Thus, when the dimmer phase angle is very low (e.g., as shown in FIG. 8B), it is costly and computationally intensive to determine the full sine wave of which the chopped section is a part. According to various embodiments, this can be avoided by determining the input mains voltage only when the dimmer is above a determination threshold where an accurate determination can be made, e.g., without having to substantially increase the processing power or load of the microcontroller 715.

Figure 10:
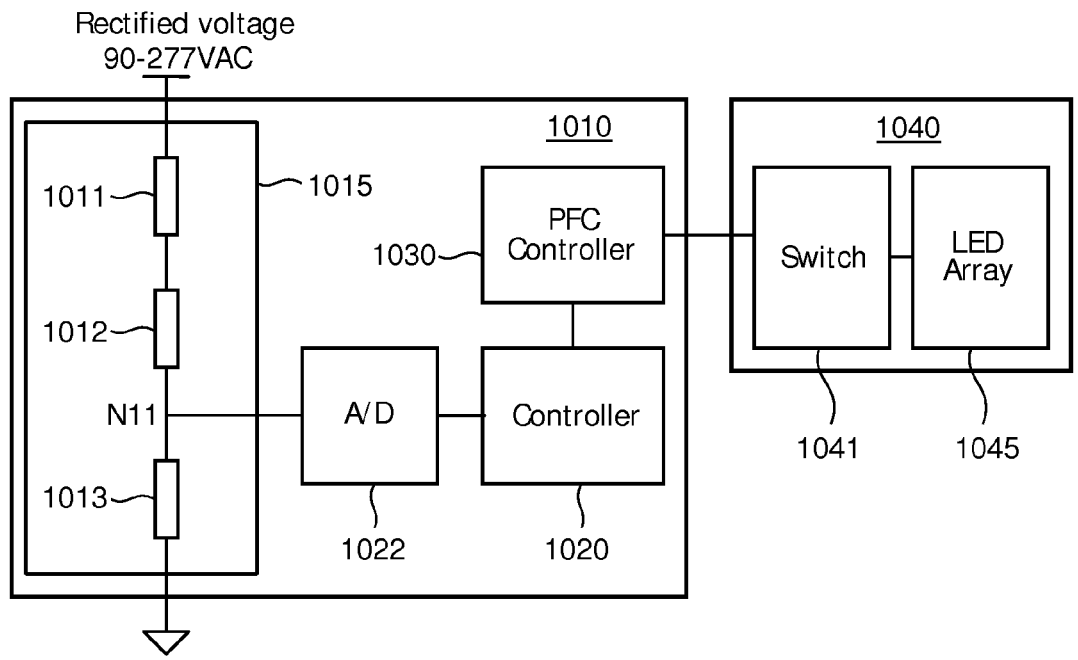
FIG. 10 is a block diagram showing a lighting system, including a solid state lighting fixture and an input voltage controller, according to a representative embodiment.

FIG. 10 is a block diagram showing a lighting system, including a solid state lighting fixture and an input voltage controller, according to a representative embodiment. Referring to FIG. 10, input voltage controller 1010 includes voltage divider 1015, analog-to-digital (A/D) converter 1022, controller 1020 and transition mode power factor correction (PFC) controller 1030.

The voltage divider 1015 receives rectified voltage from a power source. Generally, the rectified voltage is an input mains or AC line voltage signal having a voltage value, e.g., between about 90 VAC and about 277 VAC, and a corresponding waveform. The input mains voltage signal is used to power the solid state lighting fixture 1040. The voltage divider 1015 provides a signal corresponding to a divided down version of the rectified input mains voltage signal. The voltage signal is provided to the A/D converter 1022 as an analog input voltage signal.

In the depicted embodiment, the voltage divider 1015 includes first and second resistors 1011 and 1012 connected in series between the rectified input mains voltage source and node N11, which is connected to an input of the controller 1020. The voltage divider 1015 further includes third resistor 1013 connected between node N11 and ground. In an embodiment, the first and second resistors 1011 and 1012 each have a resistance of about 750 kΩ, and the third resistor 113 has a resistance of about 13 kΩ. It is understood that, in other embodiments, the resistance values of the first through third resistors 1011-1013 and/or the configuration of the voltage divider 1015 may vary to provide unique benefits for any particular situation or to meet application specific design requirements of various implementations, as would be apparent to one skilled in the art.

The A/D converter 1022 receives the analog input voltage signal from the voltage divider 1015, converts the analog input voltage signal to digital values indicating the waveform of the rectified input mains voltage. The controller 1020 receives the digital values from the A/D converter 1022 and determines the voltage level of the input mains voltage based on the digital values. The controller 1020 adjusts a control signal based on the determined voltage level of the input mains voltage, and outputs the control signal to the PFC controller 1030 to control the solid state lighting fixture 1040. For example, based on the control signal, the PFC controller 1030 outputs a power modulation control signal to run the solid state lighting fixture 1040 at a steady state of 30 W for any detected value of the input mains voltage (e.g., 120 VAC, 230 VAC or 277 VAC), as discussed below.

The controller 1020 may be constructed of any combination of hardware, firmware or software architectures, as discussed above, without departing from the scope of the present teachings. Also, the controller 1020 may include its own memory (e.g., nonvolatile memory) for storing executable software/firmware executable code that allows it to perform the various functions of the voltage controller 1010. For example, in various embodiments, the controller 1020 may implemented as a microprocessor, ASIC, FPGA, microcontroller, such as a PIC12F683 microcontroller available from Microchip Technology, Inc., or the like. Likewise, the PFC controller 1030 may be constructed of any combination of hardware, firmware or software architectures, without departing from the scope of the present teachings. For example, in various embodiments, the PFC controller 1030 may implemented as a microprocessor, ASIC, FPGA, microcontroller, such as an L6562 PFC controller, available from ST Microelectronics, or the like. In addition, although depicted separately, it is understood that the A/D converter 1022 and/or the PFC controller 1030, and associated functionality, may be incorporated within the controller 1020 in various embodiments. Further, in various embodiments, the controller 1020 and the PFC controller 1030 may be implemented by the microcontroller 715 and the power controller 720 of FIG. 7, for example, without departing from the scope of the present teachings.

Figure 11:
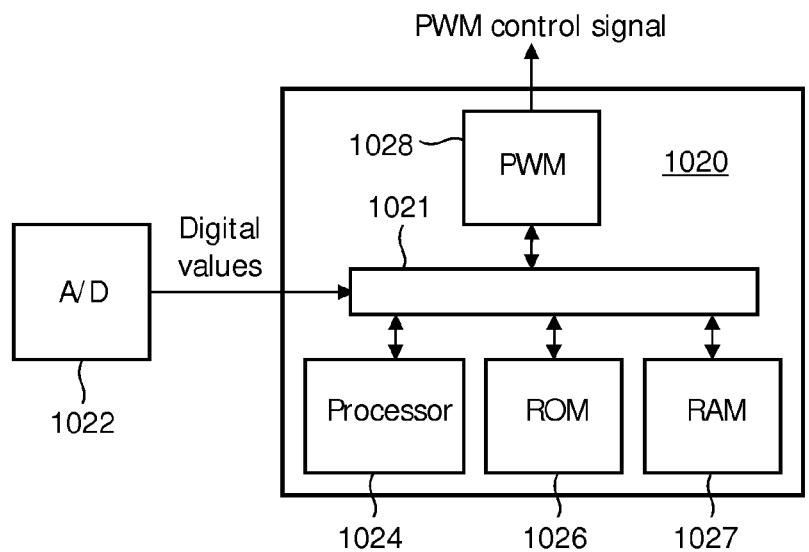
FIG. 11 is a block diagram of a controller for an input voltage controller, according to a representative embodiment.

FIG. 11 is a block diagram of controller 1020, according to a representative embodiment. Referring to FIG. 11, the controller 1020 includes processor 1024, read-only memory (ROM) 1026, random-access memory (RAM) 1027 and PWM signal generator 1028.

As discussed above, the A/D converter 1022 receives the input signal from the voltage divider 1015, and converts the input signal to digital values, indicating the waveform of the rectified input mains voltage. The digital values are received by the processor 1024 for processing, and also may be stored in ROM 1026 and/or RAM 1027, e.g., via bus 1021. The processor 1024 may include its own memory (e.g., nonvolatile memory) for storing executable software/firmware executable code that allows it to perform the various functions of the voltage controller 1010. Alternatively, the executable code may be stored in designated memory locations within ROM 1026 and/or RAM 1027. The ROM 1026 may include any number, type and combination of tangible computer readable storage media, such as PROM, EPROM, EEPROM, and the like. Further, the ROM 1026 and/or RAM 1027 may store statistical data and results of previous input mains voltage calculations by the processor 1024, for example.

The PWM signal generator 1028 generates and outputs a PWM signal as the control signal, in response to instructions or control signals from the processor 1024. More particularly, in the depicted embodiment, the PWM signal generator 1028 varies the pulse width of the PWM control signals depending on the value of the input mains voltage determined by the processor 1024. For example, the PWM signal generator

1028 may generate PWM control signals having shorter pulse widths in response to higher values of the input mains voltage. The PWM control signal is output from the controller 1020 to the PFC controller 1030, which controls power modulation of the solid state lighting fixture 140 in accordance with the pulse widths of the PWM control signal. For example, the PFC controller 1030 may be configured to increase current to the solid state lighting fixture 1040 in response to larger pulse widths, thus maintaining a constant power for lower voltage values (e.g., 120 VAC). Likewise, the PFC controller 1030 may be configured to decrease current to the solid state lighting fixture 1040 in response to shorter pulse widths, thus maintaining a constant power for higher voltage values (e.g., 277 VAC).

For example, in an embodiment, the PFC controller 1030 has a dedicated current setting pin on its device. By setting a voltage reference on the current setting pin, the PFC controller 1030 will deliver an amount of power to the solid state lighting fixture 1040 that is related to the voltage reference seen on the current setting pin. The PWM control signal output from the controller 1020 (with altering pulse width, depending on the input voltage waveform) goes through a filter circuit (not shown) in the PFC controller 1030 and effectively changes the voltage reference on the current setting pin of the PFC controller 1030. This allows the change in overall power going through LEDs in an LED array 1045 of the solid state lighting fixture 1040. Of course, other types of control signals and methods of controlling the solid state lighting fixture 1040 may be incorporated within the scope of the present teachings.

Referring again to FIG. 10, the solid state lighting fixture 1040 may be an EssentialWhite™ lighting fixture, available from Philips Color Kinetics, for example. The solid state lighting fixture 1040 includes a switch 1041 and a light source or illumination source, such as representative LED array 1045. The switch 1041 switches power to the LED array 1045 on and off in response to the power modulation control signal received from the PFC controller 1030, which concurrently changes the steady state current. For example, the amount of "on" time may determine the amount of current through the LEDs of LED array 1045. The timing or cycle of switching the power to the LED array 1045 thus adjusts for the various values of the input mains voltage. For example, a higher input mains voltage (e.g., 277 VAC) would require shorter "on" intervals (resulting in less current) to provide steady state power (e.g., 30 W) to the LED array 1045 than a lower input mains voltage (e.g., 120 VAC).

Figure 12:
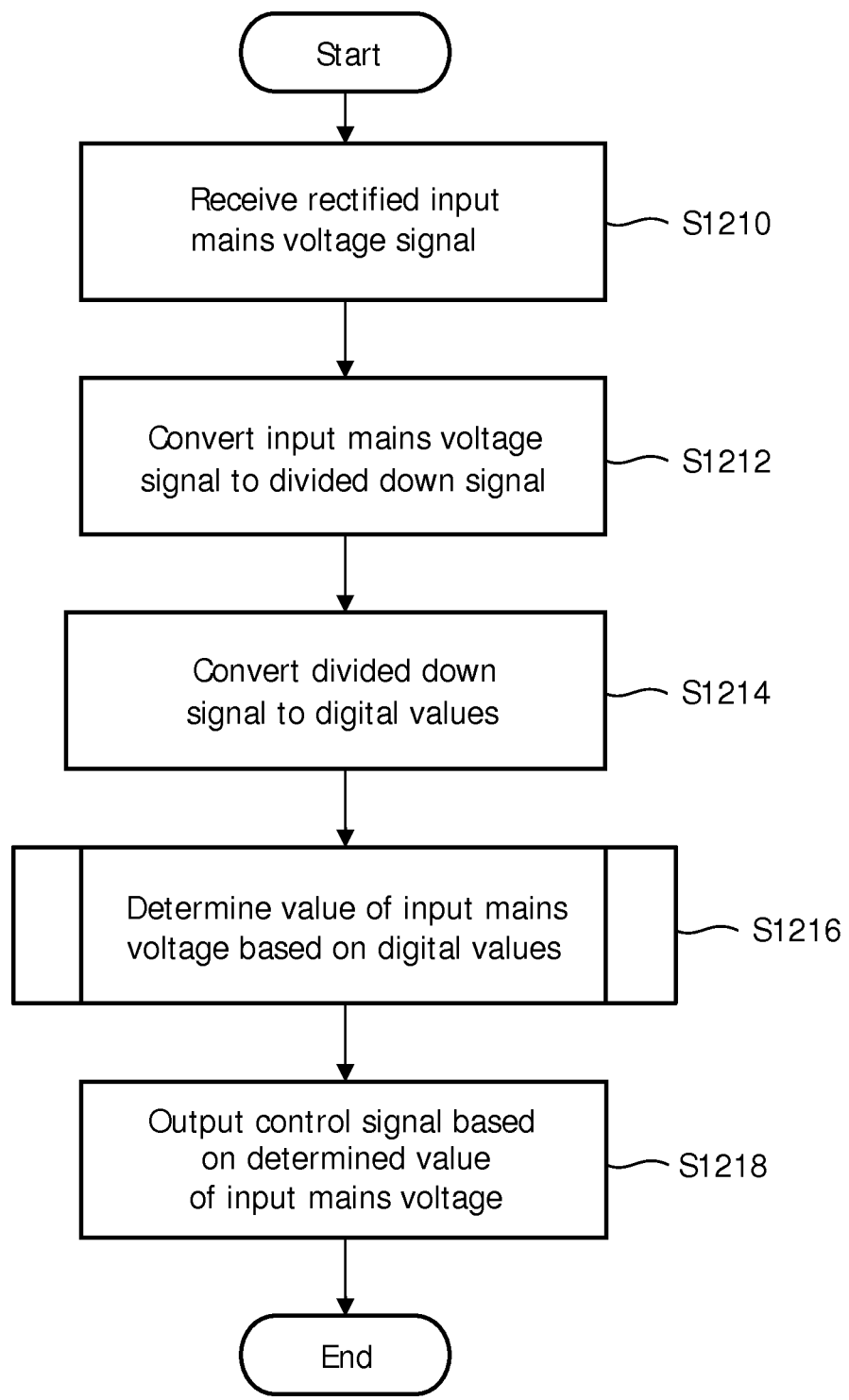
FIG. 12 is a flow diagram showing a process of controlling power to a solid state lighting fixture, according to a representative embodiment.

FIG. 12 is a flow diagram showing a process of controlling power of a solid state lighting fixture, according to a representative embodiment. The various steps and/or operations depicted in FIG. 12 may be implemented by the A/D converter 1022 and the controller 1020, for example, discussed above with reference to FIGS. 10 and 11.

In block S1210, a rectified AC line voltage or input mains voltage signal is received for powering the solid state lighting fixture. The magnitude or value of the input mains voltage signal is not known, and may be any one of various available input mains voltages, such as 120 VAC, 230 VAC or 277 VAC. In block S1212, the input mains voltage signal is converted to a divided down signal, e.g., by voltage divider 1015, which provides a divided down signal corresponding to a waveform of the input mains voltage signal. The divided down signal is converted from analog to digital, e.g., by A/D converter 1022, in block S1214 to provide digital values representing the waveform of the input mains voltage signal.

In operation S1216, the magnitude or value of the input mains voltage signal is determined, e.g., by controller 1020 and/or processor 1024, using the digital values, described in more detail with reference to FIGS. 13-15, below. Generally, a peak detect algorithm is executed to determine whether the input mains voltage has a high or intermediate value (e.g., 277 VAC or 220-240 VAC). However, the peak detection algorithm alone may not able to detect the value of the input mains voltage, for example, when the input mains voltage has a low value (e.g., 120 VAC) or when the input mains voltage signal has an intermediate value (e.g., 230 VAC) that has been dimmed. When the peak detection algorithm is not able to detect the value of the input mains voltage, a slope detection algorithm is performed to determine whether a slope of a rising edge of the input mains voltage signal waveform corresponds to the low value or the intermediate value.

After the value of the input mains voltage is determined, a control signal is generated and output, e.g., to PFC controller 1030, based on the determined value, in block S1218. Based on the control signal, power modulation of the solid state lighting fixture is adjusted to account for the input mains voltage value.

Figure 13:
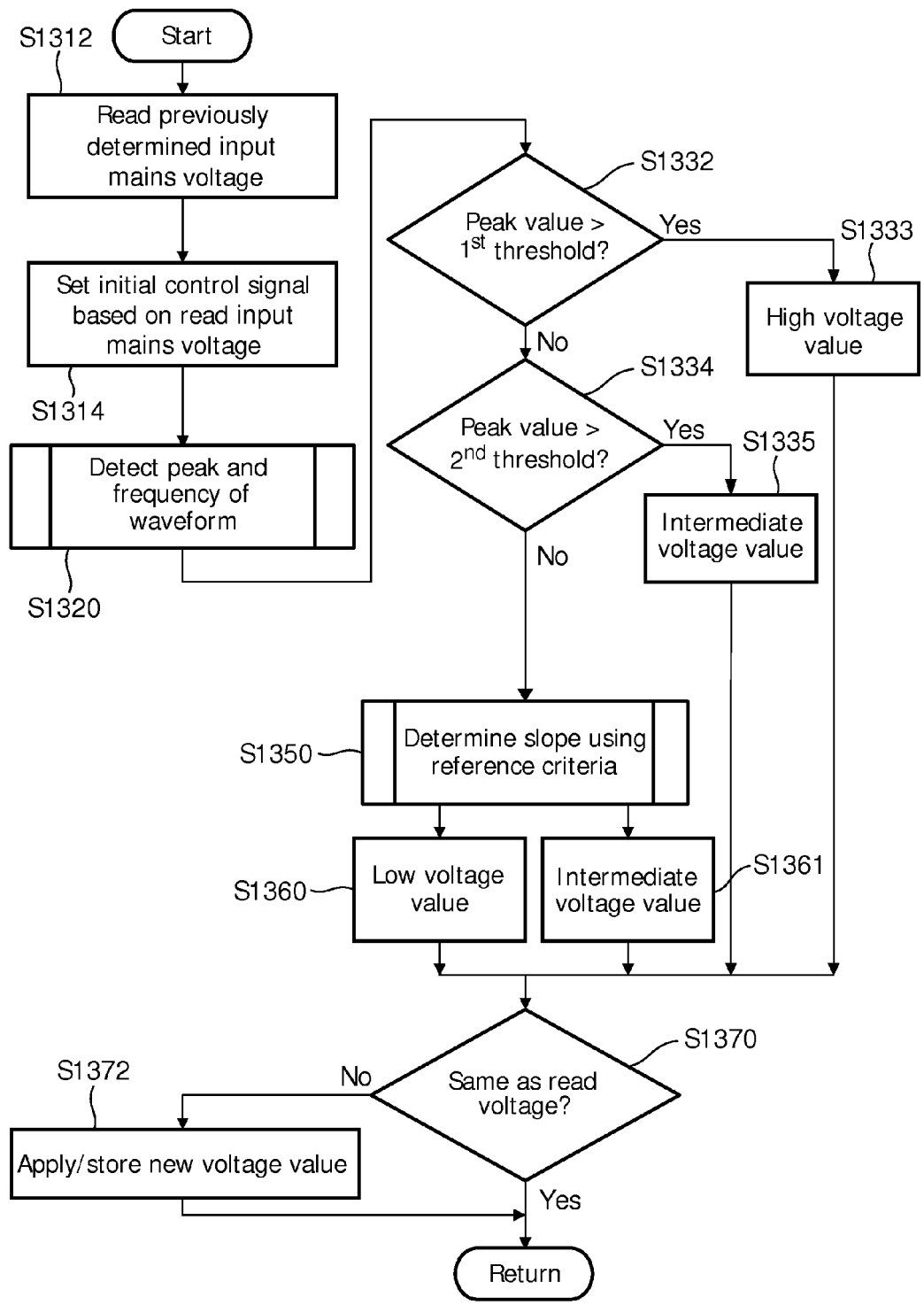
FIG. 13 is a flow diagram showing a process of determining a voltage value of an input mains voltage signal, according to a representative embodiment.

FIG. 13 is a flow diagram showing a process of determining the value of the input mains voltage signal, according to a representative embodiment. More particularly, FIG. 13 shows a representative embodiment in which the value of the input mains voltage (or AC line voltage) is associated with one of multiple predetermined voltage values (e.g., low, intermediate, or high). The process may be referred to as "binning," since the input mains voltage is placed in a "bin" corresponding to one of the predetermined voltage values.

In various embodiments, the precise value of the input mains voltage may be determined, e.g., based on the peak and slope detection processes shown in blocks S1320 and S1350 of FIG. 13, whenever the chopped sine wave produced by a phase chopping dimmer is sufficient to enable such determination. For example, as discussed above with reference to FIGS. 7-9, when the dimmer phase angle is above a determination threshold (e.g., as shown in FIG. 8A), the precise value of the input mains voltage may be calculated using relatively little processing power.

Referring to FIG. 13, the process is first initialized, indicated for example by blocks S1312 and S1314. In an embodiment, the initialization is performed only upon powering up the solid state lighting fixture, although the initialization may be omitted entirely or performed at other times within the process of determining the value of the input mains voltage in alternative embodiments, without departing from the scope of the present teachings. When available, a previously determined input mains voltage value is retrieved from memory in block S1312, and the control signal, e.g., output by the controller 1020, is initially set based on the previously determined input mains voltage value in block S1314. If the control signal is a PWM control signal, for instance, the PWM pulse width or duty cycle is initially set according to the previously determined input mains voltage value. For example, the value of the input mains voltage may be determined and stored, e.g., in ROM 1026, every time the solid state lighting fixture is turned on. Accordingly, the solid state lighting fixture is operated at the previously determined value of the input mains voltage while the present value of the input mains voltage is being determined. This prevents flickering or other adverse affects during the determination process.

In operation S1320, a peak detection algorithm is performed in order to detect peaks and frequency of the input mains voltage signal, based on the digital values, e.g., provided by A/D converter 122. The peak detection algorithm of operation S1320 is discussed in detail with reference to FIG. 14, which is a flow diagram showing a process of determining signal peaks and frequency of the input mains voltage signal, according to a representative embodiment.

Figure 14:
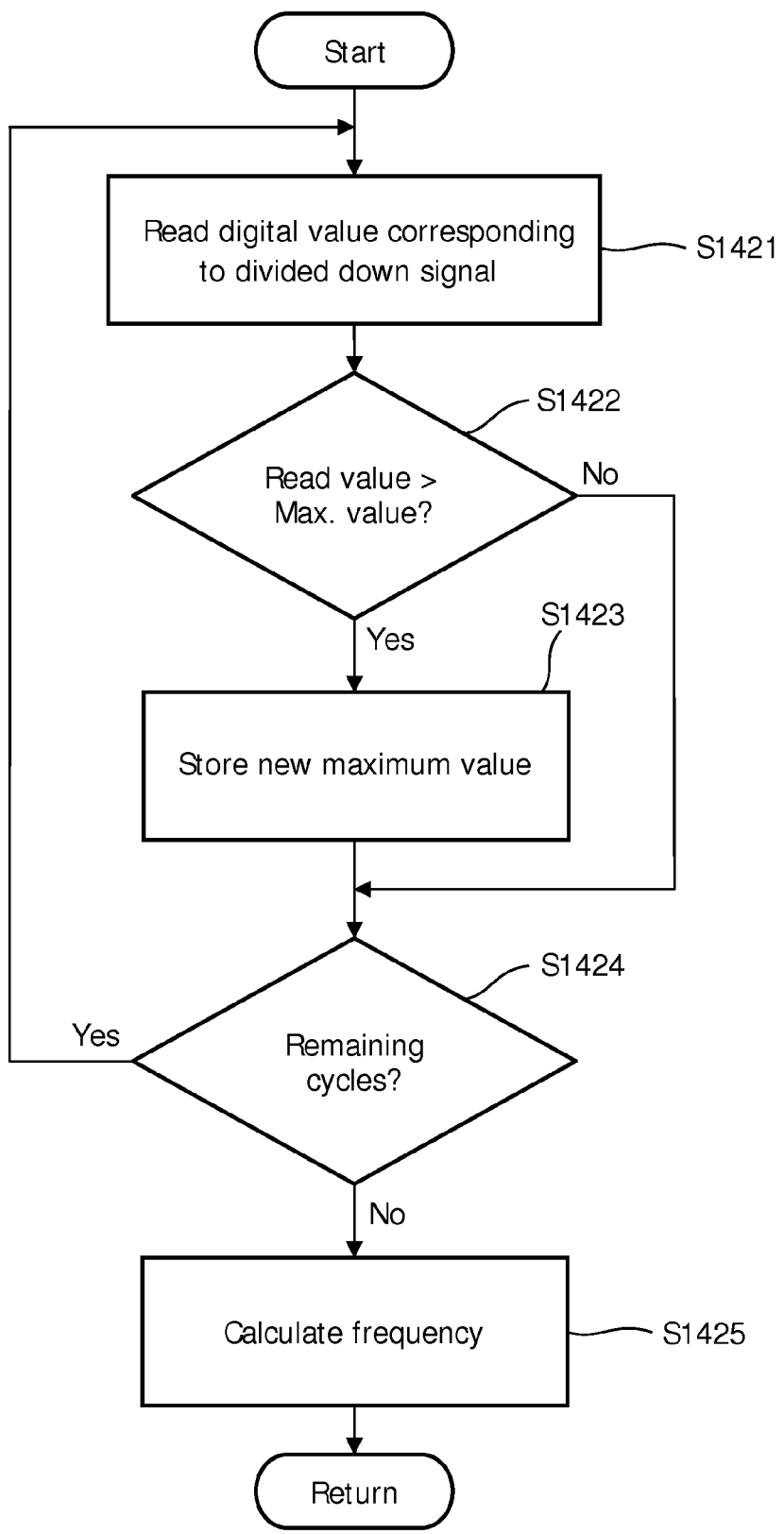
FIG. 14 is a flow diagram showing a process of detecting peaks of an input mains voltage signal waveform, according to a representative embodiment.

Referring to FIG. 14, digital values of the DC voltage signals (e.g., from block S1214 of FIG. 12) are read during a predetermined number of cycles (e.g., 20 cycles) or for a predetermined period of time (e.g., 150 mS) in order to identify and store the maximum digital values, corresponding to peaks of the input mains voltage signal waveform, and/or to identify the frequency of the input mains voltage signal. For example, the processor 1024 may sample a number of digital values of the DC voltage signal from the A/D converter 1022. In order to identify the maximum digital values, a digital value of the divided down signal, corresponding to a divided down version of the rectified input mains voltage, is read in block S1421 and compared to a maximum value in block S1422. The maximum value may be a predetermined threshold value or a stored digital value that was previously determined to be the maximum value from among previously read digital values.

When the read digital value is greater than the maximum value (block S1422: Yes), the read digital value is stored as the new maximum value in block S1423, to be used in comparisons with subsequently read digital values. When the read digital value is not greater than the maximum value (block S1422: No), block S1423 is skipped. It is determined in block S1424 whether additional cycles (or time) remain for reading digital values. For example, the number of cycles or elapsed time may be compared to a predetermined threshold or a predetermined time period, respectively, for reading the digital values. When there are additional cycles or time (block S1424: Yes), blocks S1421 through S1423 are repeated. When there are no additional cycles or time for reading the digital values (block S1424: No), the current maximum value among the sampled digital values is deemed the peak value of the waveform.

The frequency of the waveform of the input mains voltage is calculated in block S1425, e.g., by comparing timing between zero crossings or between adjacent peak values. For example, it is determined in block S1425 whether the input mains voltage is 50 Hz or 60 Hz, which is typically dictated by the geographic location of the solid state lighting fixture installation. The frequency of the waveform is determined since it directly influences the slope of the waveform, which is calculated in operation S1350 of FIG. 13, discussed below. In an embodiment, the frequency of the waveform may be determined by sampling a point on waves of the waveform (e.g., peaks or starting points of the waves) over a period of cycles and calculating the amount of time between adjacent waves.

After determining the frequency in block S1425 of FIG. 14, the process returns to FIG. 13. In blocks S1332-S1335 of FIG. 13, it is determined whether the value of the input mains voltage signal can be determined without having to determine the slope of the corresponding waveform. In particular, in block S1332, the peak value of the waveform is compared to a predetermined first threshold value to determine whether the value of the input mains voltage signal is a maximum voltage value (e.g., 277 VAC). When the peak value is greater than the first threshold value (block S1332: Yes), it is determined that the value of the input mains voltage signal is the maximum voltage value in block S1333.

When the peak value is not greater than the first threshold value (block S1332: No), the process proceeds to block S1334, in which the peak value of the waveform is compared to a predetermined second threshold value to determine whether the value of the input mains voltage signal is an intermediate voltage value (e.g., 230 VAC) or a range of possible intermediate voltage values (e.g., 220 VAC-240 VAC). When the peak value is greater than the second threshold value (block S1334: Yes), it is determined that the value of the input mains voltage signal is the intermediate voltage value (or the range of possible intermediate voltage values) in block S1335.

When the peak value is not greater than the second threshold value (block S1334: No), the process determines the value of the input mains voltage signal based on the slope of the waveform. That is, when the peak value is not greater than the second threshold value, the input mains voltage signal may be either a low voltage value (e.g., 120 VAC) or a dimmed intermediate voltage value (e.g., 230 VAC), which conditions are otherwise indistinguishable based solely on peak value determination.

Figure 16A:
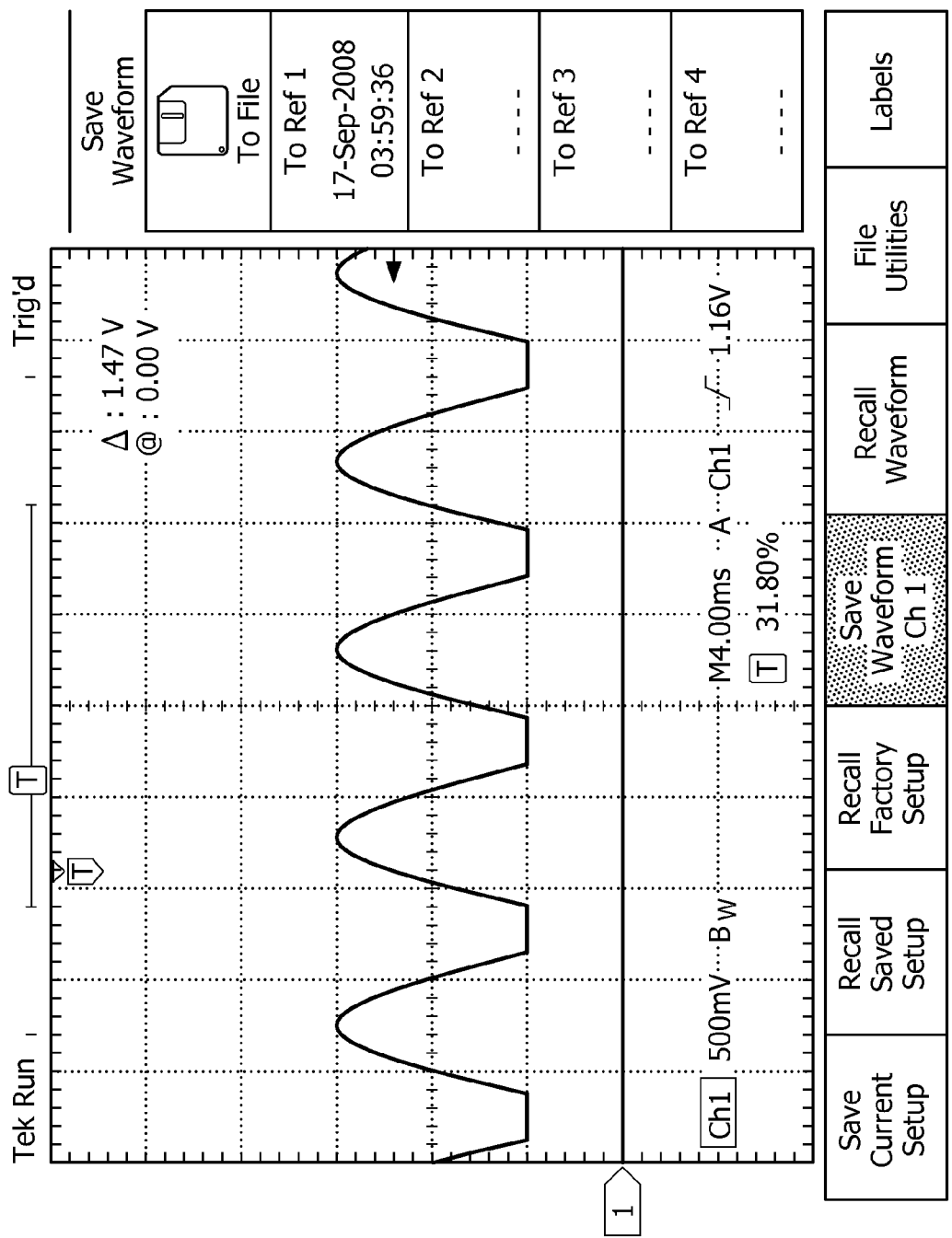
FIGS. 16A and 16B are sample traces of waveforms of undimmed and dimmed input mains voltage signals.
Figure 16B:
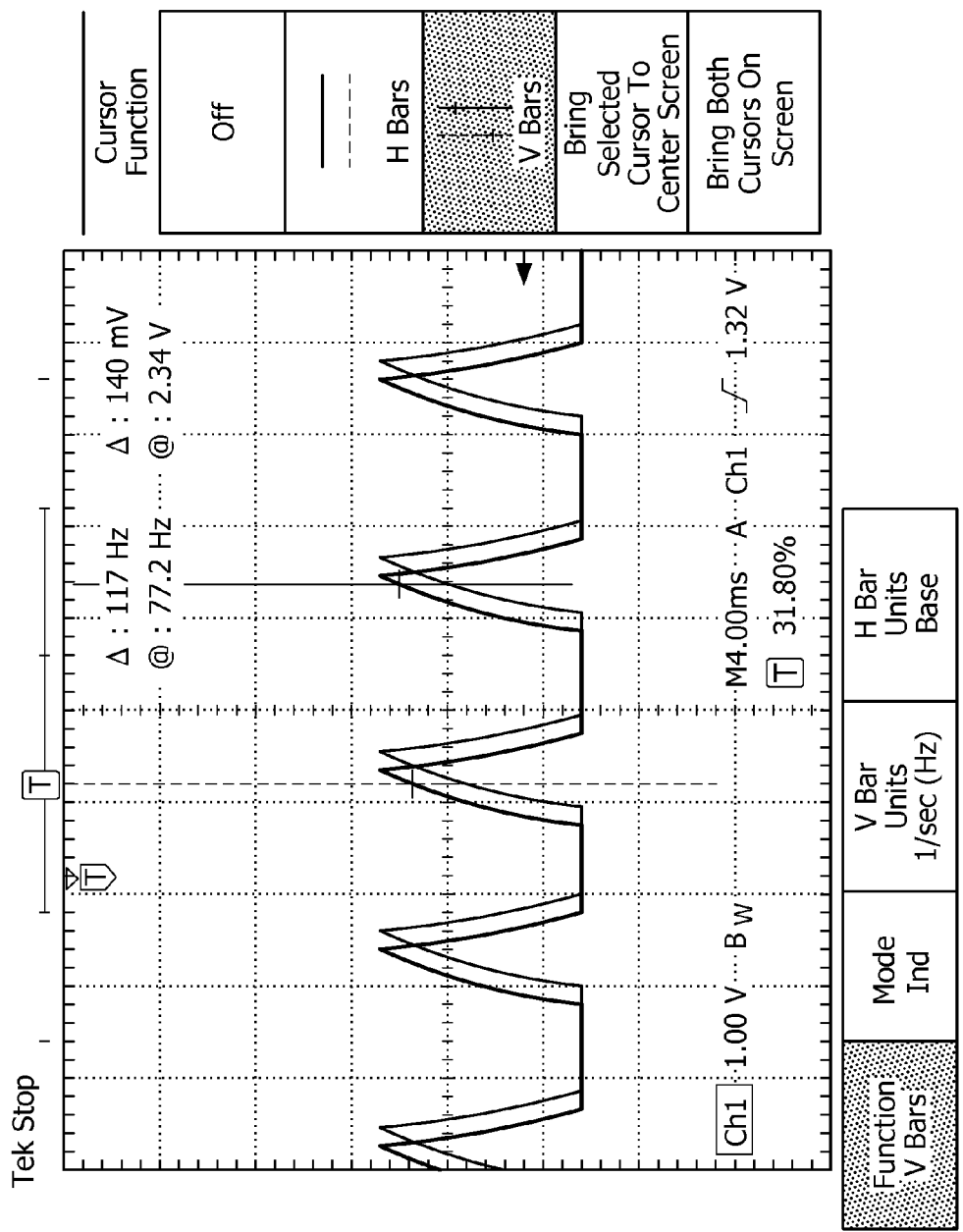

For example, FIGS. 16A and 16B are sample traces of waveforms of a 120 VAC line voltage signal and a dimmed 230 VAC line voltage signal, respectively. Comparison of FIGS. 16A and 16B shows that the frequency and peaks of the corresponding waveforms are substantially the same, but that slopes of the waveforms are different. In particular, the slopes of the waveform in FIG. 16B are generally steeper than the slopes of the waveform in FIG. 16A. Therefore, by calculating slope (e.g., in operation S1350 of FIG. 13), a determination can be made whether the input mains voltage signal is 120 VAC or 230 VAC, regardless of dimming. Of course, a dimmed 120 VAC line voltage signal (not shown), which may have a waveform with a slope similar to that of the dimmed 230 VAC line voltage signal in FIG. 16B, would still be distinguishable based on lower peaks. Therefore, in an embodiment, an additional peak comparison (not shown) may be performed if slope calculations are inconclusive.

Accordingly, when it is determined in block S1334 that the peak value is not greater than the second threshold value (block S1334: No), the process performs a slope detection algorithm, indicated by operation S1350, in order to determine the slope corresponding to rising edges of the input mains voltage signal waveform based on the digital values, e.g., provided by A/D converter 1022. The slope detection algorithm of operation S1350 is discussed in detail with reference to FIG. 15, which is a flow diagram showing a process of determining slopes of the input mains voltage signal waveform, according to a representative embodiment.

Figure 15:
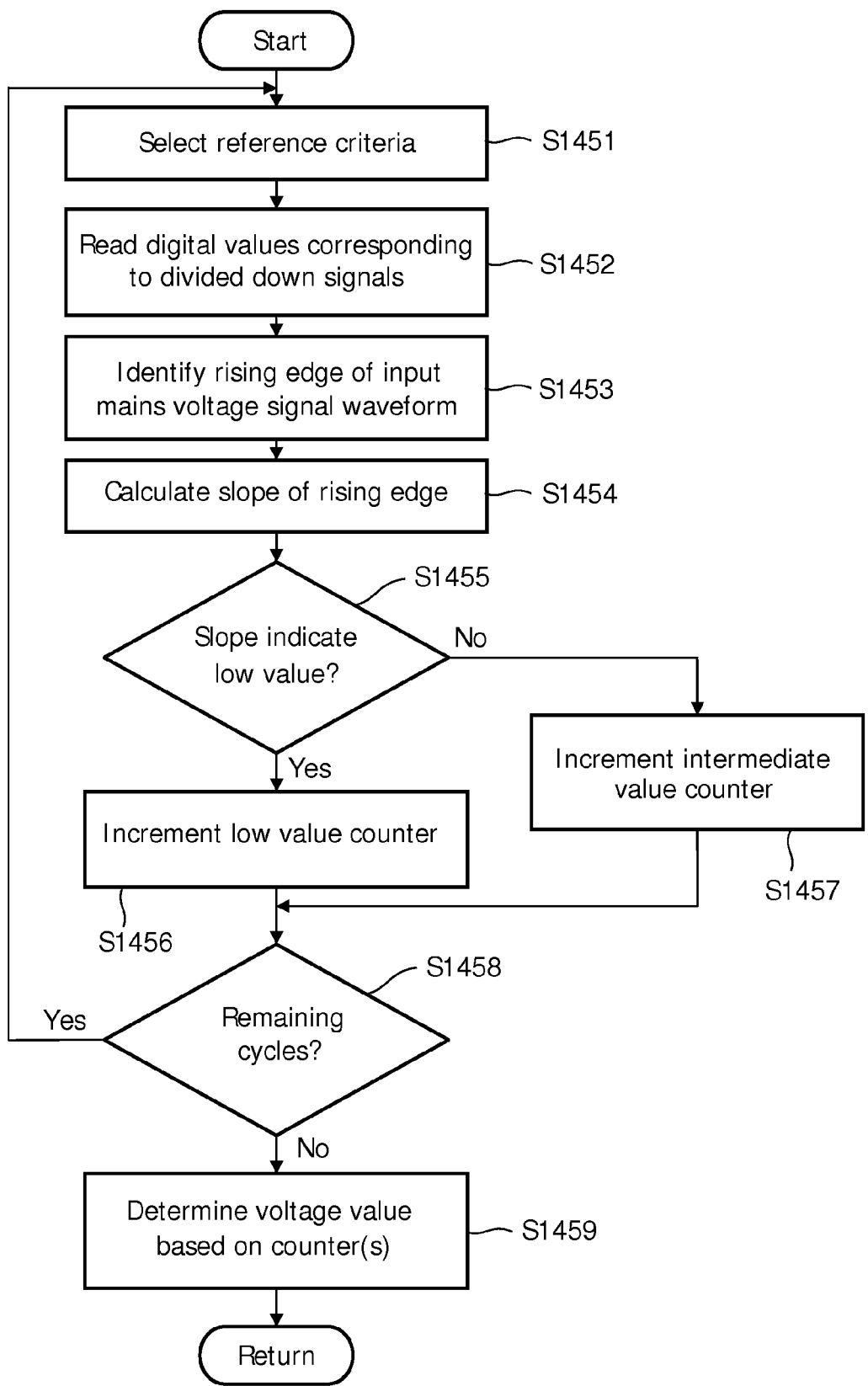
FIG. 15 is a flow diagram showing a process of determining slopes of an input mains voltage signal waveform, according to a representative embodiment.
Figure 17:
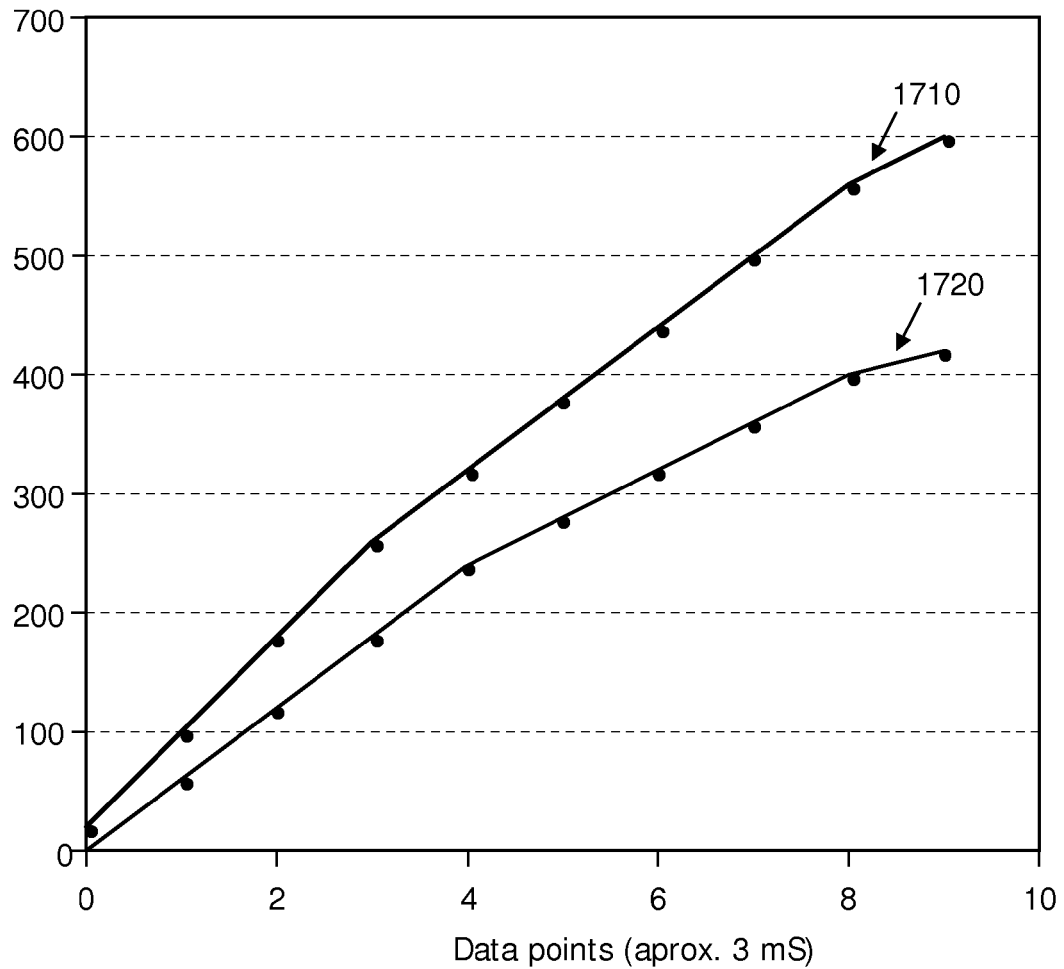
FIG. 17 is a graph showing sample slopes corresponding to waveforms of undimmed and dimmed input mains voltage signals.

Referring to FIG. 15, reference criteria are selected for slope determination in block S1451. The selection of the reference criteria is based on the frequency of the input mains voltage signal, which has been previously determined, for example, in operation S1320 and FIG. 14, discussed above. The reference criteria associate a slope or range of slopes at each possible frequency corresponding to the undimmed low voltage value and the dimmed intermediate voltage value, so that the calculated slope may be compared to each. For example, FIG. 17 is a graph showing sample slopes on which reference criteria may be based. Slope 1710 corresponds to a rising edge of a waveform in a dimmed 230 VAC line voltage signal and slope 1720 corresponds to a rising edge of a waveform in a dimmed 120 VAC line voltage signal. As discussed above, the higher input mains voltage signal value (slope 1710) is steeper.

Digital values corresponding to the divided down version of the rectified input mains voltage are read (e.g., from A/D converter 1022) in block S1452. In an embodiment, the waveform of the input mains voltage signal must be sampled (using the read digital values) over an approximate 2.5 mS time period, for example, because this is the minimum amount of the waveform that is available when ELV dimmers are dimmed to their lowest level. If sampling occurs for more than about 2.5 ms, an AC signal may not exist since it could be chopped by the dimmer. Based on the read digital values, a rising edge of the waveform of the input mains voltage signal is identified in block S1453. For example, by monitoring digital values over a period of time, a rising edge may be identified immediately upon identifying digital values that begin to increase following a series of decreasing or unchanged digital values.

Once the rising edge of the waveform is identified, the slope of the rising edge is calculated in block S1454 using multiple digital values which represent at least a portion of the rising edge. For example, a predetermined number and/or sampling of digital values may be collected, or digital values may be collected over a predetermined period of time. In an embodiment, the slope of the rising edge is calculated by comparing each of the selected digital values corresponding to the rising edge with the preceding digital value. For example, using ten digital values representative of a rising edge of the waveform, an increase of about 50 counts (see 1710 of FIG. 17) between adjacent digital values would indicate a 230 VAC line voltage, while an increase of about 25 counts (see curve 1720 of FIG. 17) between adjacent digital values would indicate a 120 VAC line voltage.

In block S1455, the calculated slope is compared to the reference criteria selected in block S1451, which depend on the frequency of the input mains voltage signal. In the depicted embodiment, the calculated slope is compared only to the reference criteria corresponding to a low voltage value (e.g., 120 VAC) for purposes of description. However, it is understood that, in various embodiments, the calculated slope may be compared to either or both of the low voltage and intermediate voltage (e.g., 230 VAC) reference criteria, without departing from the scope of the present teachings. When the comparison indicates that the calculated slope corresponds to the low voltage value (block S1455: Yes), a low voltage value counter is incremented in block S1456, and when the comparison indicates that the calculated slope does not correspond to the low voltage value (block S1455: No), an intermediate voltage value counter is incremented in block S1457.

In block S1458, it is determined whether additional sampling cycles remain. For example, a predetermined number of slopes (e.g., 60) may be calculated for corresponding sets of digital values, or the slope calculations may be repeated and collected over a predetermined period of time (e.g., 450 mS). When additional sampling cycles remain (block S1458: Yes), the process returns to the beginning, and blocks S1451 through S1458 are repeated. When no additional sampling cycles remain (block S1458: No), the process proceeds to block S1459, in which the value of the input mains voltage signal is determined. For example, at least one of the counter values may be compared to a predetermined threshold to determine whether the slopes singly or collectively indicate that the value of the input mains voltage signal is the intermediate voltage value or the low voltage value.

In an embodiment, only the intermediate voltage value counter is compared to a predetermined threshold, selected to indicate whether the value of the input mains voltage signal is the intermediate voltage value, although various embodiments may compare one or both counters, or implement another comparable identification technique. In the example where the predetermined number of slopes being calculated is 60, the predetermined threshold for the intermediate voltage may be 20, in which case the process determines that the value of the input mains voltage signal is the intermediate voltage only when the number of calculated slopes indicating the intermediate voltage value exceeds 20.

After determining the voltage value in block S1459 of FIG. 15, the process returns to FIG. 13. Depending on the result, the value of the input mains voltage signal is determined to be one of the low voltage value in block S1360 or the intermediate voltage value in block S1361. In block S1370, the determined voltage value (from one of blocks S1333, S1335, S1360 or S1361) is compared to the previously stored voltage value, initially retrieved from memory in block S1312. When the determined voltage value is the same as the previously stored voltage value (block S1370: Yes), the process ends. In this case, the control signal (e.g., output by controller 1020) remains unchanged from the setting provided by the initialization process. That is, the control signal continues to be based on the previously stored voltage value. When the determined voltage value is not the same as the previously stored voltage value (block S1370: No), the new voltage value of the input mains voltage signal is stored (e.g., in ROM 1026) and applied to change the control signal. In response, the PFC controller 1030, which receives the control signal from the controller 1020, changes the power modulation control signal provided to the solid state lighting fixture 1040 in order to adjust for the changed voltage value.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, FIG. 13 is directed to a representative embodiment in which a input mains voltage is determined to be one of three values according to a voltage binning process, a high voltage value, an intermediate voltage value or a low voltage value, which may respectively correspond to 277 VAC, 230 VAC and 120 VAC. However, various additional embodiments may be configured to determine different voltage values or ranges of voltage values (e.g., other than 277 VAC, 230 VAC and 120 VAC) and/or to determine a different number of voltage values (e.g., more or fewer than three) of input mains voltages, without departing from the scope of the present teachings.

Those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Any reference numerals or other characters, appearing between parentheses in the claims, are provided merely for convenience and are not intended to limit the claims in any way.

The invention claimed is:

1. A device for detecting a dimmer phase angle set by operation of a dimmer for a solid state lighting load, the device comprising:
   a processor comprising a digital input;
   a first diode connected between the digital input and a voltage source;
   a second diode connected between the digital input and ground;
   a first capacitor connected between the digital input and a detection node;
   a second capacitor connected between the detection node and ground; and
   a resistance connected between the detection node and a rectified voltage node, which receives a rectified voltage from the dimmer,
   wherein the processor is configured to sample digital pulses at the digital input based on the rectified voltage and to identify the dimmer phase angle based on lengths of the sampled digital pulses.

2. The device of claim 1, wherein the first capacitor is charged though the resistance on a rising edge of a signal waveform of the rectified voltage.

3. The device of claim 2, wherein the first diode clamps the digital input pin one diode drop above the voltage source when the first capacitor is charged, providing a digital pulse having a length corresponding to the signal waveform.

4. The device of claim 3, wherein the first capacitor discharges through the second capacitor on a falling edge of the signal waveform.

5. The device of claim 4, wherein the second diode clamps the digital input pin one diode drop below ground when the first capacitor is discharged.

6. The device of claim 3, wherein the processor further comprises a counter that increments a counter value while the first capacitor is charged.

7. The device of claim 6, wherein the processor determines the length of the digital pulse based on the counter value.

8. The device of claim 1, wherein the processor generates a digital control signal corresponding to the identified phase angle and outputs the digital control signal to a power converter, which outputs a DC voltage to the solid state lighting load corresponding to the dimmer phase angle based the digital control signal.

9. A method for selectively providing universal voltage input to a lighting fixture, including a dimmer, a power converter and a solid state lighting load, the method comprising:
   detecting a phase angle of the dimmer;
   determining whether the detected phase angle is below a determination threshold;
   when the detected phase angle is below the determination threshold, determining a power setting of the power converter based on a previously determined input mains voltage value; and
   when the detected phase angle is not below the determination threshold, calculating the input mains voltage value and determining the power setting of the power converter based on the calculated input mains voltage value.

10. The method of claim 9, further comprising:
    determining whether the lighting fixture is being powered-up for the first time before detecting the phase angle of the dimmer.

11. The method of claim 10, further comprising:
    when the lighting fixture is not being powered-up for the first time, retrieving the previously determined input mains voltage value from a memory and initially determining the power setting of the power converter using the retrieved previously determined input mains voltage value.

12. The method of claim 10, further comprising:
correlating the calculated input mains voltage value with an associated power setting using a took-up table.

13. The method of claim 10, wherein calculating the input mains voltage value comprises receiving a divided down version of an input rectified voltage from the dimmer via a rectification circuit and determining an accurate representation of input waveforms of the input rectified voltage.

14. The method of claim 13, wherein determining the accurate representation of the input waveforms of the input rectified voltage comprises performing a peak detection algorithm and a slope detection.

15. The method of claim 14, wherein performing the peak detection algorithm comprises:
reading digital values corresponding to a signal waveform of le divided down version of the input rectified voltage;
comparing the digital values with a previously identified maximum value;
identifying a current maximum value as a digital value that exceeds the previously identified maximum value;
identifying a peak value of the signal waveform as the current maximum value; and
calculating a frequency of the signal waveform using the peak value.

16. The method of claim 15, wherein performing the slope detection algorithm comprises:
selecting reference criteria based on the calculated frequency of the signal waveform;
reading sets of digital values corresponding to the signal waveform;
identifying rising edges of the signal waveform corresponding to the sets of digital values; calculating slopes of the identified rising edges; and
calculating the input mains voltage value based on comparing the calculated slopes with the reference criteria.

17. The method of claim 9, further comprising:
when the detected phase angle is below the determination threshold and there is no previously determined input mains voltage value, estimating the input mains voltage value and determining the power setting of the power converter based on the estimated input mains voltage value.

18. The method of claim 17, wherein estimating the input mains voltage value comprises associating the input mains voltage with one of a plurality of predetermined voltage values using a binning process.

* * * * *